United States Patent [19]
Oran et al.

[11] Patent Number: 5,920,316
[45] Date of Patent: *Jul. 6, 1999

[54] TASKBAR WITH START MENU

[75] Inventors: Daniel P. Oran, Cambridge, Mass.; Ian M. Ellison-Taylor, Seattle, Wash.; Chee H. Chew; Joseph D. Belfiore, both of Redmond, Wash.; Mark A. Malamud, Seattle, Wash.; Jeffrey L. Bogdan, Redmond, Wash.; Kent D. Sullivan, Bellevue, Wash.

[73] Assignee: Microsoft Corporation, Redmond, Wash.

[*] Notice: This patent is subject to a terminal disclaimer.

[21] Appl. No.: 08/963,846

[22] Filed: Nov. 4, 1997

Related U.S. Application Data

[63] Continuation of application No. 08/572,725, Dec. 14, 1995, Pat. No. 5,757,371, which is a continuation of application No. 08/478,490, Jun. 7, 1995, abandoned, which is a continuation of application No. 08/354,916, Dec. 13, 1994, abandoned.

[51] Int. Cl.⁶ ..................................................... G06F 15/00
[52] U.S. Cl. ........................... 345/348; 345/349; 345/352; 345/354
[58] Field of Search ........................... 345/326, 334, 345/335, 339, 340, 342, 348, 349, 350, 351, 352, 353, 354, 333, 341

[56] References Cited

U.S. PATENT DOCUMENTS

| | | | |
|---|---|---|---|
| 5,146,556 | 9/1992 | Hullot et al. | 359/159 |
| 5,367,624 | 11/1994 | Cooper | 395/157 |
| 5,398,310 | 3/1995 | Tchao et al. | 395/144 |
| 5,412,776 | 5/1995 | Bloomfield et al. | 395/160 |
| 5,414,806 | 5/1995 | Richards | 395/135 |
| 5,436,637 | 7/1995 | Gayraud et al. | 345/338 |
| 5,487,143 | 1/1996 | Southgate | 395/157 |
| 5,604,861 | 2/1997 | Douglas et al. | 395/352 |
| 5,657,049 | 8/1997 | Ludolph et al. | 345/348 |
| 5,678,039 | 10/1997 | Hinks et al. | 395/604 |
| 5,754,174 | 5/1998 | Carpenter et al. | 345/334 |

FOREIGN PATENT DOCUMENTS

| | | |
|---|---|---|
| 0 483 777 A2 | 5/1992 | European Pat. Off. . |
| 0 483 777 A3 | 5/1992 | European Pat. Off. . |
| 2 693 810 | 1/1994 | France . |
| 3618256A1 | 12/1987 | Germany . |
| WO 94/29793 | 12/1994 | WIPO . |

OTHER PUBLICATIONS

"DeScribe, Lotus Tackle 32-bit WP," *PC Week*, 26 (Nov. 9, 1992).
"Drive Windows by the Light of the Dashboard," *PC World*, vol. 10(10), 52 (Oct. 1992).
"For Windows Dashboard™ —The Fastest Way to work in Windows," *Owner's Handbook*, Hewlett–Packard Co., 1–89 (1993).
"From Little Acorns . . . ," *Desktop Publishing Today*, 20, 22, 24, (Dec./Jan. 1989/1990).

(List continued on next page.)

*Primary Examiner*—Ba Huynh
*Attorney, Agent, or Firm*—Leydig, Voit & Mayer, Ltd.

[57] ABSTRACT

A taskbar is provided that supplies visual cues, such as buttons, for each application having an active window. These visual cues inform a user of the currently active windows and may be used to display the active windows. The taskbar may also include a start menu button that enables a user to gain access to a menu for launching programs, opening documents and controlling system settings. The taskbar is resizable and may be anchored to different locations on a video display. The taskbar may operate in a mode where it is not obscurable by other windows. The taskbar may also be displayed in a mode where it is not displayed when another window is in a non-minimized state.

27 Claims, 39 Drawing Sheets

OTHER PUBLICATIONS

"Graphical Window List System," *Research Disclosure*, No. 348, 270 (entire document), Emsworth, GB (Apr. 1993).

"ICON Safe Zone," *IBM Technical Disclosure Bulletin*, vol. 35(6), 34–35 (Nov. 1992).

"New Version of Dashboard from HP Has More Than 25 New Features . . . ," *Business Wire* (Aug. 9, 1993).

*Norton Desktop™ for Windows User's Guide—The Norton Desktop*, Symantec Corporation, 4–1 to 4–9, 5–1 to 5–7, 6–1 to 6–11 (1993).

*User's Guide—Microsoft® Publisher, Desktop Publishing Program, Version 2.0 Windows™ Series*, Microsoft Corporation, 44–45 (1993).

*User's Guide to OS/2 Warp*, International Business Machines Corporation, Chapter 3, 38–43 (1994).

*What's New in System 7 Pro–Installation and New Capabilities*, Apple Computer, Inc., 16–19 (1993).

"Windows: HP Ships Dashboard for Windows . . . ," *EDGE: Work–Group Computing Report*, vol. 3(120), 4 (Sep. 7, 1992).

Ayre, Rick, "Dashboard for Windows," *PC Magazine*, vol. 12 (1), 120 (Jan. 12, 1993).

Beattie, Rob, "Dash It All!," *PC User*, No. 196, 53 (Oct. 21, 1992).

Bigley, Tom, "Dashboard Adds Useful Goodies to Windows," *Infoworld*, vol. 14(49), 136 (Dec. 7, 1992).

Clancy, Heather, "HP Delivers $99 'Dashboard' Windows Utility," *Computer Reseller News*, No. 490, 57 (Sep. 7, 1992).

Fernandez, Charles V., "A Graphical User Interface for a Multimedia Environment," *Hewlett–Packard Journal*, 20–22 (Apr. 1994).

Finnie, Scot, "HP's Splashy Dashboard," *PC Computing*, vol. 5(10), 90 (Oct. 1992).

Gilliand, Steve, "Dashboard 1.0," *PC Sources*, vol. 4(5), 263 (May 1993).

Grevstad, Eric, "Dashboard Keeps Windows On Board," *Computer Shopper*, vol. 12(11), 694 (Nov. 1992).

Hart, Ken, "HP's Dashboard Aids Users in the Fast Lane," *Computer Shopper*, vol. 13(1), 588 (Jan. 1993).

Haskin, David, "Sick of Clunky Windows? HP's New Dashboard to the Rescue," *PC Computing*, vol. 6(9), 48 (Sep. 1993).

Kehoe, Mike B., "Paradise by the Dashboard Lights," *HP Professional*, vol. 6(10), 38 (Oct. 1992).

Methvin, David (ed.). "Dashboard—Utilities at Your Fingertips," *Windows Magazine*, Issue 409, 96 (Sep. 1, 1993).

Morgan, Cynthia,"Why Buy the Car When You Can Get the Dashboard for $99?," *Government Computer News*, vol. 11(26), 46 (Dec. 21, 1992).

Pompili, Tony, "Dashboard Puts the User in the Driver's Seat," *Windows Sources*, vol. 1(1), 248 (Feb. 1993).

Radosevich, Lynda, "Dashboard for Windows," *Lotus*, vol. 8(11), 72 (Nov. 1992).

Rohbrough, Linda, "New for Windows: HP's Dashboard—Race Car Metaphor," *Newsbytes* (Sep. 3, 1992).

Rohbrough, Linda, "New for Windows: HP's Dashboard—Updated Report," *Newsbytes* (Sep. 4, 1992).

Safi, Quabidur R., "HP's Dashboard Eases Windows Use," *PC Week*, vol. 10(31), 81 (Aug. 9, 1993).

Scannell, Ed, "Dashboard Tunes Up Handling of Windowed Applications," *Infoworld*, vol. 14(37), 24 (Sep. 14, 1992).

Sheldon, Kenneth M., "HP's Push–Button Dashboard for Windows," *Byte*, vol. 17(10), 64 (Oct. 1992).

Simon, Barry, "The Cabbage Patch," *PC Magazine*, vol. 11(16), 177 (Sep. 29, 1992).

Simon, Barry, "HP Squeezes More Tools into Slim Dashboard 2.0," *PC Magazine*, 50 (Sep. 28, 1993).

Simon, Barry, "HP's Dashboard: Another Way to Drive Windows," *PC Magazine*, vol. 11(19), 53 (Nov. 10, 1992).

Simon, Barry, "Launching Programs," *PC Computing*, vol. 6(4), 119 (Apr. 1993).

TASKBAR WITH START MENU

This is a continuation application of Ser. No. 08/572,725, filed on Dec. 14, 1995, now U.S. Pat. No. 5,757,371, entitled "TASKBAR WITH START MENU," which is a continuation of application Ser. No. 08/478,490, filed on Jun. 7, 1995, now abandoned, entitled "TASKBAR WITH START MENU," which is a continuation of Ser. No. 08/354,916, filed Dec. 13, 1994, now abandoned, entitled "TASKBAR WITH START MENU" of Oran et al.

TECHNICAL FIELD

This invention relates generally to data processing systems and, more particularly, to the use of a taskbar having a start window in a data processing system.

BACKGROUND OF THE INVENTION

The "MICROSOFT" WINDOWS, Version 3.1, operating system, sold by Microsoft Corporation of Redmond, Wash., provides users with a window-based graphical user interface. In the environment provided by this operating system, application programs have associated windows that users make visible in a non-minimized form to use the applications. Typically, an application has an associated icon. The user makes the window for the application visible in a non-minimized form by positioning a mouse cursor to point at the icon for the application and then double clicking a designated mouse button. Unfortunately, double clicking the mouse button is difficult for some users. For example, some users have difficulty in clicking the mouse button twice with sufficient speed for the system to interpret their actions as double clicking. Furthermore, certain users inadvertently move the mouse during the double clicking so that their actions are not properly interpreted.

Another difficulty encountered in the graphical user interface of the "MICROSOFT" WINDOWS, Version 3.1 operating system is that visible non-minimized windows and minimized windows (i.e., icons) may be obscured by other non-minimized windows or icons. As a result, it is often difficult for novice users to know what applications are currently active. Further, many novice users are confused by one window obscuring another. These users do not understand what has happened to the window that has been obscured.

Many novice users are also confused by the hierarchy provided by this environment. The top of the hierarchy is the program manager which displays icons for each of the program groups that are available. The next level of the hierarchy is formed by the program groups. To gain access to the programs in a program group, a user typically opens a window associated with the program group. The programs group window displays icons for each of the applications that is available in the program group. The user may then open any of these programs via a file menu or by double clicking on the program icon. Traversing this hierarchy is quite difficult for many users and many users get lost in the hierarchy so that they do not know how to properly navigate.

Other complications with this conventional approach are that users do not know how or where to obtain help information. Further, users have difficulty opening documents and switching programs.

SUMMARY OF THE INVENTION

In accordance with a first aspect of the present invention, a method to practice a computer system having an input device and a video display. In this method, a user interface element is output on the video display. The user interface element is in a mode such that it cannot be obscured by windows. The user interface element includes a sub-element for each application that has an active window in the computer system. The sub-elements indicate to the user which applications currently have active windows. A request is made to display a non-minimized window of a selected one of the applications by manipulating the sub-element in response to the user using the input device.

In accordance with another aspect of the present invention, a method is practiced in an environment wherein applications are being run on a computer system. A task for a user interface element is output on a video display in a mode such that it cannot be obscured by windows. Visual indicators are displayed on the task bar user interface element for each of the applications that has an active window. A non-minimized window for a selected one of the applications is displayed in response to the user using an input device. A previously closed application is then launched and a visual indicator is displayed on the taskbar user interface element for the previously closed application.

In accordance with a further aspect of the present invention, the computer system includes a video display and a processor. The processor is used for running applications and a system resource for displaying a taskbar user interface element. The taskbar user interface element displays a sub-element for each associated application that has an active window. The taskbar user interface element is in a mode where windows cannot obscure the taskbar user interface element. The computer system also includes an input device for manipulating one of the sub-elements to display a non-minimized window for the associated application of one of the sub-elements.

In accordance with an additional aspect of the present invention, a task for a user interface element is provided on a video display such that it is anchored to a location on the video display. The taskbar user interface element includes visual elements that identify each application that has an active window. These visual elements may be used to make visible non-minimized windows for the applications. A means for moving the taskbar user interface element in response to a user using an input device is provided so that a taskbar user interface element may be anchored to another location on the video display. This means is moved to anchor the taskbar user interface element to a new location on the video display.

In accordance with yet another aspect of the present invention, a taskbar user interface element is displayed on the video display by an operating system. The taskbar user interface element includes a visual element for accessing a start menu and an indicator of currently active tasks. The start menu is displayed in response to a user using an input device to manipulate the visual element for accessing the start menu. The start menu includes a documents option. In response to a user selecting the documents option with the input device, a list of the most recently opened documents which the user may access is displayed.

In accordance with a further aspect of the present invention, a task user interface is displayed to include a visual element for accessing a start menu and an indicator of currently active tasks. A means for configuring the start menu is used to add a new item to the start menu at a request of a user. The start menu is then displayed with the new item. The start menu also includes items for a user to access programs and documents.

In accordance with an aspect of the present invention, a taskbar user interface element is displayed on a video display. The taskbar user interface element includes visual indicators of currently active tasks. A means for displaying a context menu for the taskbar user interface element is used. The context menu includes items for determining how windows are displayed relative to each other. The context menu also includes a selected item for undoing a last choice of one of the items for determining how windows are displayed relative to each other. In response to a user choosing the selected item, the affect of a last choice of one of the items for determining how windows are displayed relative to each other is undone.

In accordance with an aspect of the present invention an object is displayed on a video display. A taskbar user interface element is also displayed on the video display. The taskbar user interface element includes a visual indicator for each application that has an active window. The object that is displayed on the video display is dragged to be positioned over a selected one of the visual indicators on the taskbar user interface element in response to the user using a mouse. The object remains positioned over the selected visual indicator for a threshold period of time. In response to the object being positioned over the selected visual indicator for the threshold period of time a window for the application of the selected visual indicator is opened.

In accordance with a further aspect of the present invention, a user interface element is displayed on a video display when no windows for application programs are currently visible in a non-minimized state. The user interface element includes a visual indicator for each application that has an active window to identify the associated application and for opening windows of the associated applications. The user interface element is hidden from being displayed on the video display when a window of one of the applications is opened.

DETAILED DESCRIPTION OF THE INVENTION

The preferred embodiment of the present invention provides a taskbar and start menu for overcoming many of the difficulties encountered by conventional systems. The taskbar is a consistently visible user interface element that informs a user which tasks are currently active. The taskbar is constructed so that it is not obscurable by open windows, unless the user so selects to obscure the taskbar. The taskbar also serves as a point for displaying currently active task windows. The taskbar includes a button for each active task. Users merely need to single click on a taskbar button provided for a task to display the task window. These button may also be used to switch tasks. The taskbar remains anchored at a fixed location on the user interface. This fixed anchor location may, however, be changed by a user. The taskbar also includes a start menu button which serves as a centralized location for accessing programs via the user interface. The start menu includes menu items that allow a user to readily access desired programs, documents or system controls. The start menu is configurable, as will be described in more detail below.

Figure 1:
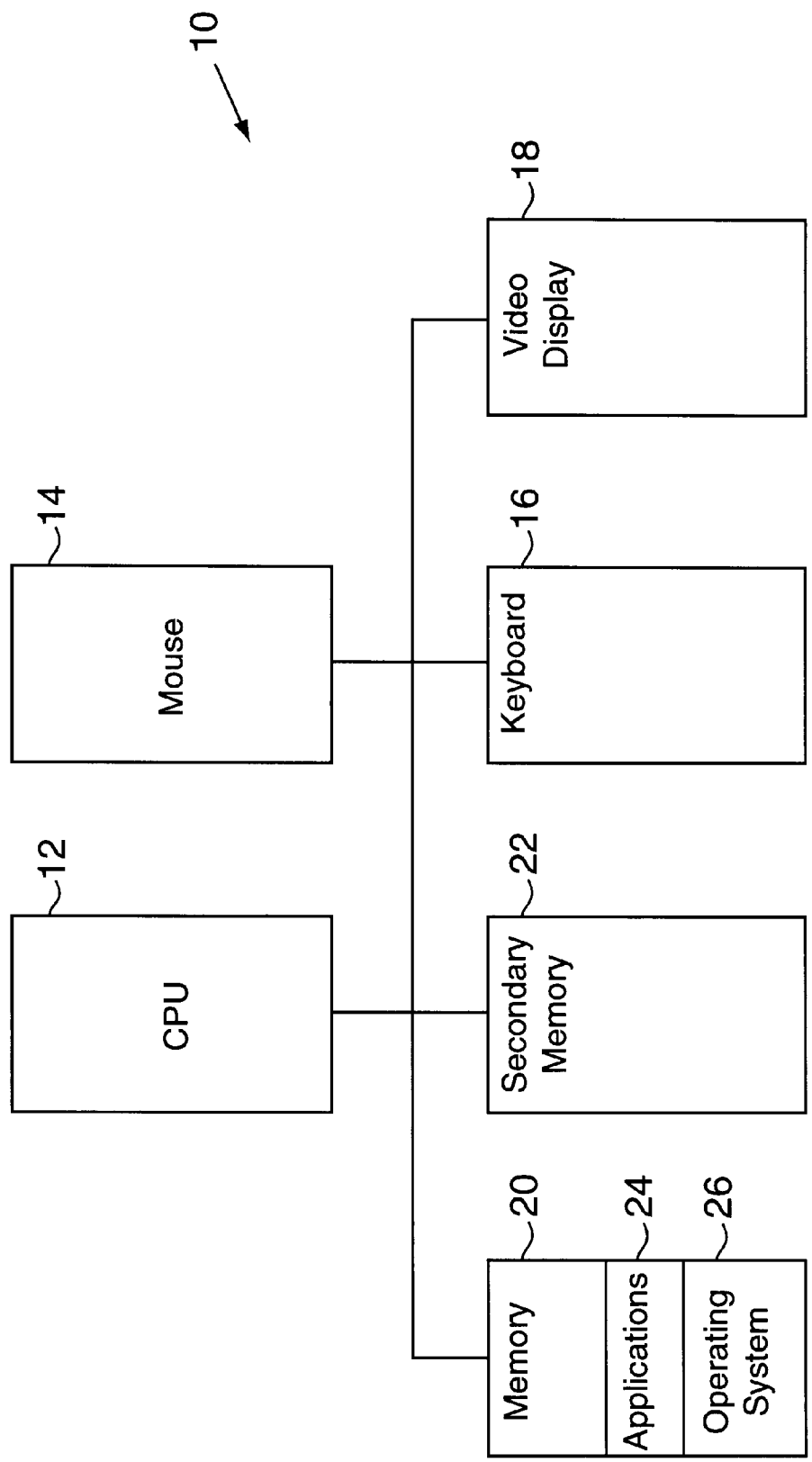
FIG. 1 is a block diagram of the computer system that is suitable for practicing the preferred embodiment of the present invention.

FIG. 1 is a block diagram of a computer system 10 that is suitable for practicing the preferred embodiment of the present invention. The computer system includes a central processing unit (CPU) 12, which has access to several peripheral devices, including a mouse 14, a keyboard 16 and a video display 18. The mouse 14 includes at least a left mouse button and right mouse button. The CPU 12 also has access to memory 20 and secondary memory 22. The memory 20 holds copies of applications 24 and an operating system 26. In the preferred embodiment of the present invention, the taskbar and start menu are provided by the shell of the operating system 26. Nevertheless, those skilled in the art will appreciate that the present invention is not limited to being practiced in an operating system. Rather, the present invention may also be implemented through utilities or other system resource. For purposes of the discussion below, it is assumed that the operation system 26 is the "MICROSOFT" WINDOWS 95 operating system from Microsoft Corporation. Those skilled in the art will appreciate that the present invention may also be practiced with other operating systems.

The taskbar is implemented by the operating system 26 as a window. With the operating system 26, a window is always created based upon a window class. The window class identifies a window procedure that processes messages that are sent to the window. The operating system 26 supports a RegisterClass( ) function that enables an application to register window classes. The window procedure is a function that receives and processes messages that are sent to the window. The operating system 26 is a message-based operating system such that operations are achieved by passing messages between windows.

Figure 2:
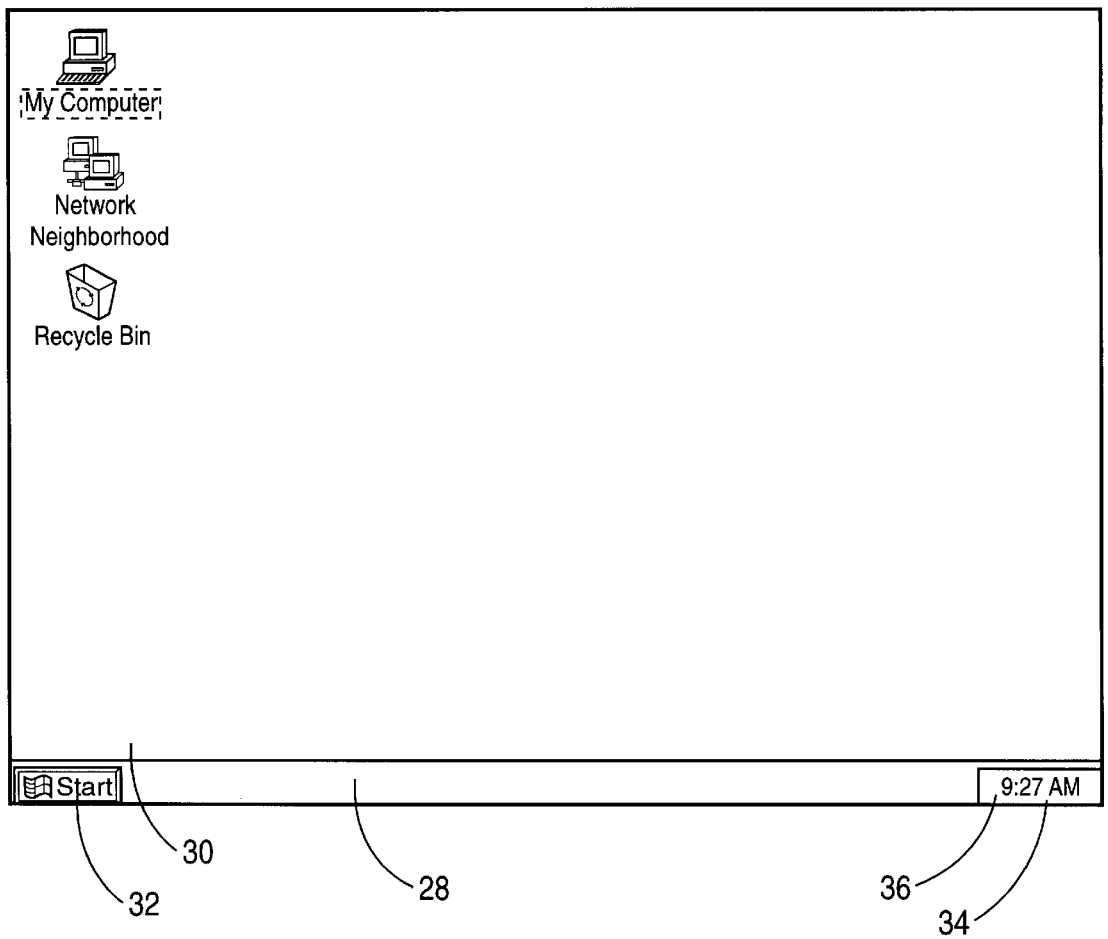
FIG. 2 is an example of a user interface that employs the taskbar of the preferred embodiment of the present invention.

FIG. 2 shows an example of the graphical user interface provided by the operating system 26 of the preferred embodiment of the present invention. A taskbar 28 is positioned at the bottom of a virtual desk top 30 on the video display 18 (FIG. 1). In the example shown in FIG. 2, the taskbar 28 extends from the left-hand side of the user interface to the right-hand side of the user interface and is anchored to the bottom edge of the video display. The taskbar 28 has a uniform width throughout its length. The taskbar 28 includes a start menu button 32 for gaining access to the start menu. The start menu will be discussed in more detail below. The taskbar 28 also includes a clock 34 and taskbar notification area 36. The clock 34 displays a current time. The taskbar notification area 36 may display icons that serve as visual notifications of events or to convey status information. The taskbar notification area is described in more detail in co-pending application entitled "System Provided Visual Notification Area," Ser. No. 08/355,398, now U.S. Pat. No. 5,617,526, which is assigned to a common assignee with the present invention and was filed on even date herewith. The start menu button 32 and the clock 34 maintain fixed positions within the taskbar 28 as long as the taskbar remains anchored at a given location.

The taskbar buttons and start menu button 32 are implemented as tab controls, such as described in co-pending application entitled "System Provided Child Window Controls," Ser. No. 08/355,400, which is assigned to a common assignee with the present application and was filed on even date herewith. Controls are child windows that reside within parent windows and send notification message to parent windows when events, such as input from a user, occur within the child window. In particular, a child window processes a mouse and keyboard messages and notifies the parent window when a state of child window is changed. This enables the child window to act as a kind of input device of the parent window.

Figure 3:
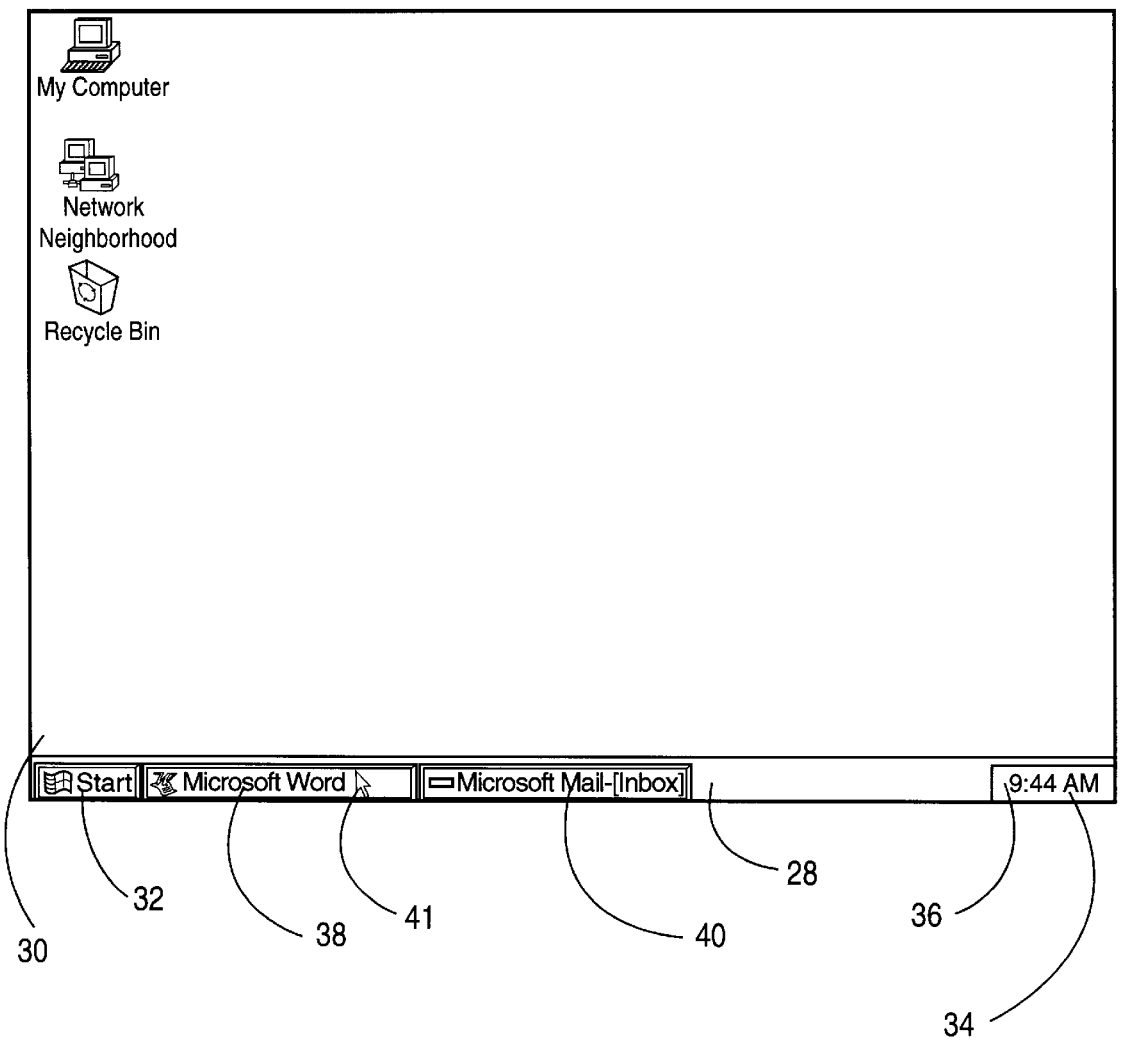
FIG. 3 illustrates the appearance of the taskbar of FIG. 2 when two application programs have been opened and their windows have been minimized.
Figure 4:
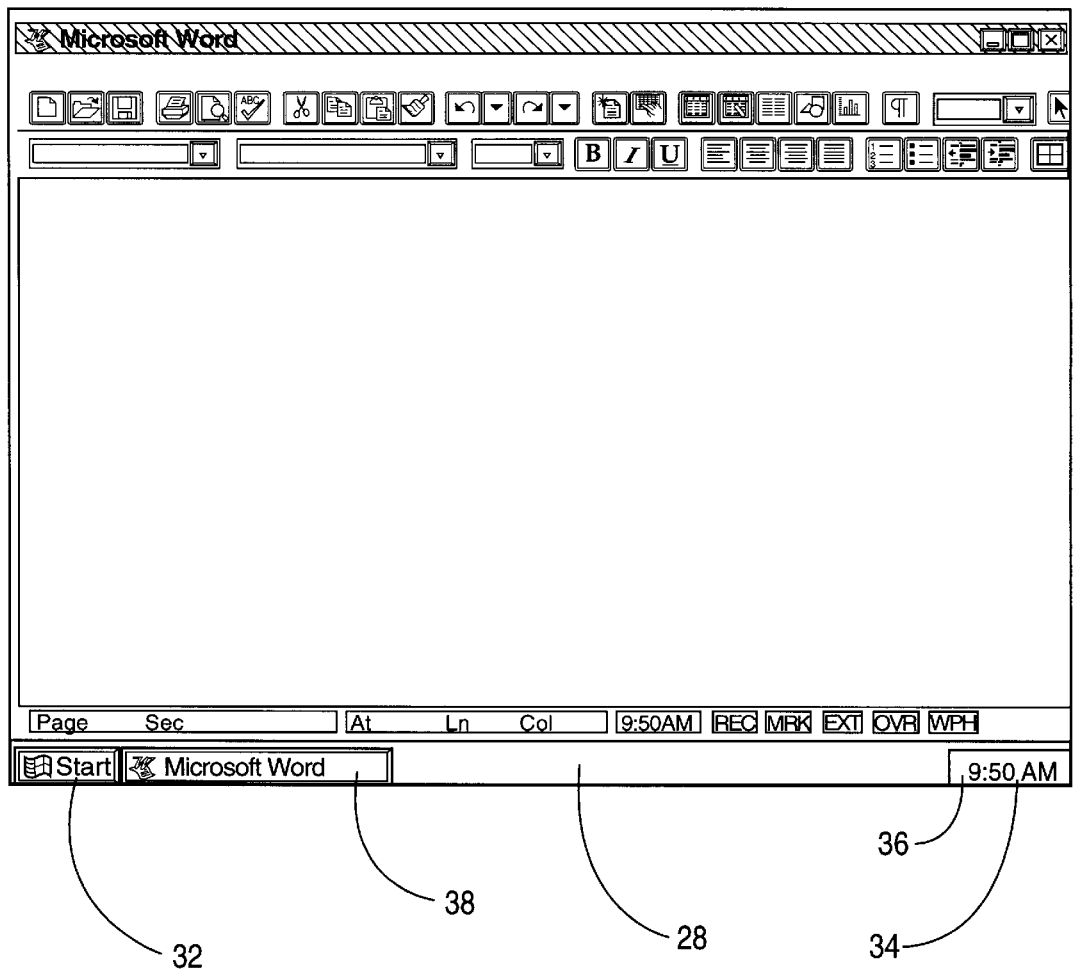
FIG. 4 shows an example of how a program may be made fully visible from taskbar buttons on the taskbar.

As mentioned above, the taskbar 28 serves as a centralized location for identifying all of the currently active tasks within the system. FIG. 3 shows an example of the appearance of the taskbar 28 when a word processing program and an electronic mail program are currently active. The taskbar 28 indicates the tasks that are active by displaying taskbar buttons like button 38 and button 40 shown in FIG. 3. The borders of the buttons 38 and 40 are drawn as raised to provide a three-dimensional effect and to indicate that the window for the task is not opened. A user displays an active task window from the taskbar 28 by positioning a mouse cursor 41 to point at a taskbar button using the mouse 14 or other suitable input device and then single clicking the left mouse button to open the window associated with the task to display it in a visible non-minimized state. For example, suppose that only the word processing program was currently active and the user clicked on the left mouse button of the mouse 14 while the mouse cursor 41 was positioned at the button 38 for the word processing program, window 42 for the word processing program is opened as shown in FIG. 4. In addition, the taskbar button 38 for the word processing program is redrawn to indicate that it is depressed. Thus, the user is provided with a visual cue that a window, that is associated with the task, is currently active.

From a programming perspective, the following steps take place to display a window for a task that has a button on a taskbar. Initially, the taskbar button, as a child window control, receives a mouse message when the mouse cursor is positioned to point at the taskbar button. The taskbar button then receives a mouse message indicating that the left mouse button has been clicked. This mouse message is passed on to the parent taskbar process, which is responsible for managing and displaying the taskbar 28. The taskbar 28 receives the mouse messages and, in response, decides to open the word processing window as shown in FIG. 4. In addition, the child window control changes its appearance to indicate that the button is depressed.

Figure 5:
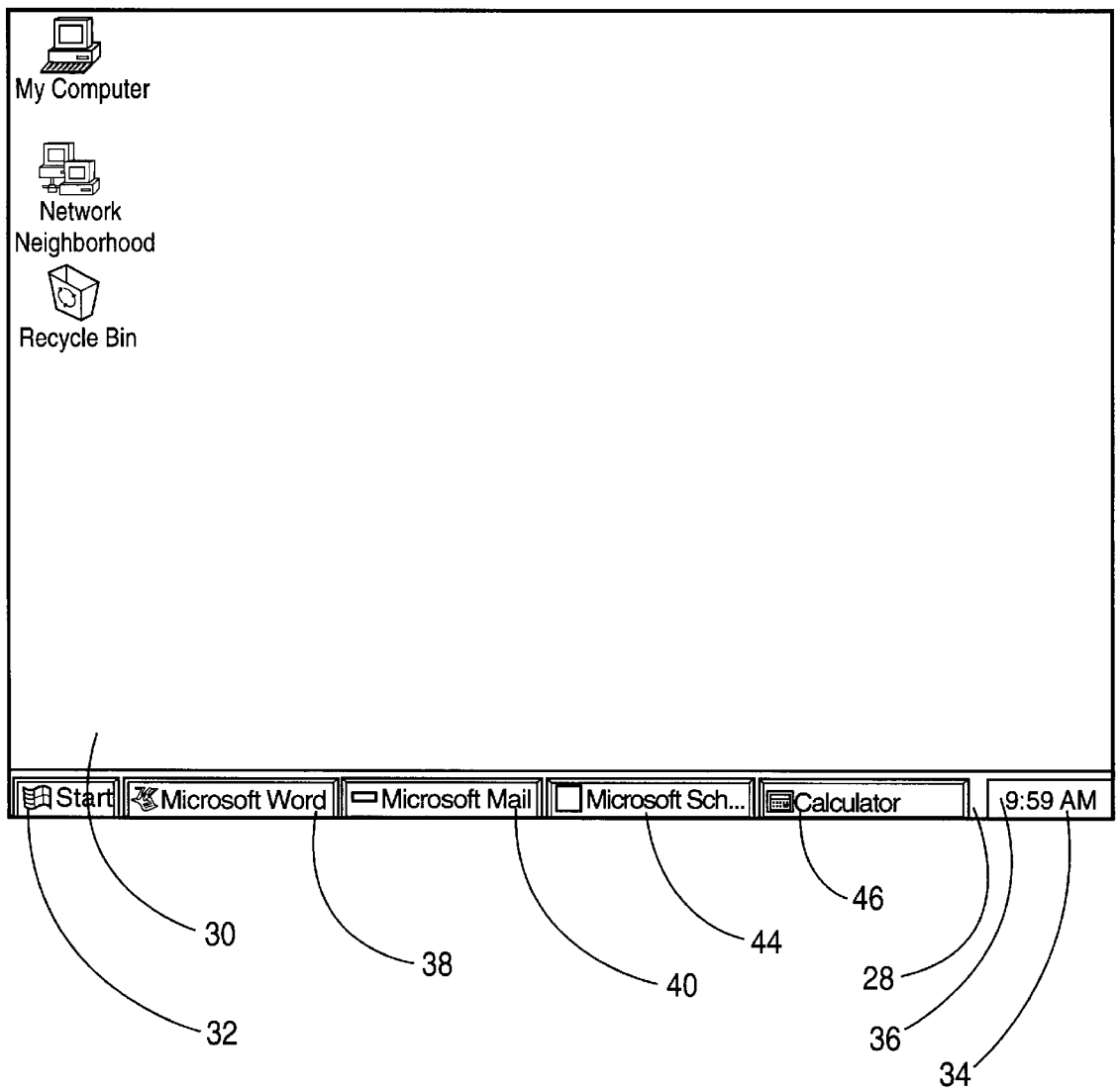
FIG. 5 shows an example of how taskbar buttons may be automatically resized based on the available amount of space on the taskbar.

The size of the taskbar buttons varies depending upon the amount of space that is available on the taskbar 28. FIG. 3, shows taskbar buttons 38 and 40 with their maximum permissible size. If, however, additional tasks become active, taskbar buttons for these additional tasks must be added to the taskbar 28. In many instances, in order to adequately display all of the active tasks, the taskbar buttons must be redrawn to a new size. For example, FIG. 5 shows an example wherein a schedule program and a calculator program have also become active. Thus, the taskbar buttons for these newly activated tasks must be displayed on the taskbar 28. In order to adequately display all of the taskbar buttons for all of the active tasks, the size of all of the taskbar buttons is changed. Hence, taskbar buttons 38, 40, 44, and 46 as shown in FIG. 5 are of smaller width than the taskbar buttons 38 and 40 shown in FIG. 3.

In order to determine a new size for the taskbar buttons when resizing is necessary, the taskbar calculates the available space within the taskbar 28 for displaying taskbar buttons. The taskbar then determines the number of buttons that must be displayed and divides the available space by the number of taskbar buttons to be displayed. The taskbar then determines the appropriate size for the taskbar buttons based on these calculations. When the taskbar buttons are displayed in an instance where the taskbar 28 is anchored to the bottom edge of the video display 18, the buttons are displayed in a left-justified fashion. The operating system 26 provides mechanisms for redrawing each of the taskbar buttons as child window controls. Essentially, redrawing the taskbar buttons involve resizing each of the windows associated with the taskbar buttons.

Figure 6:
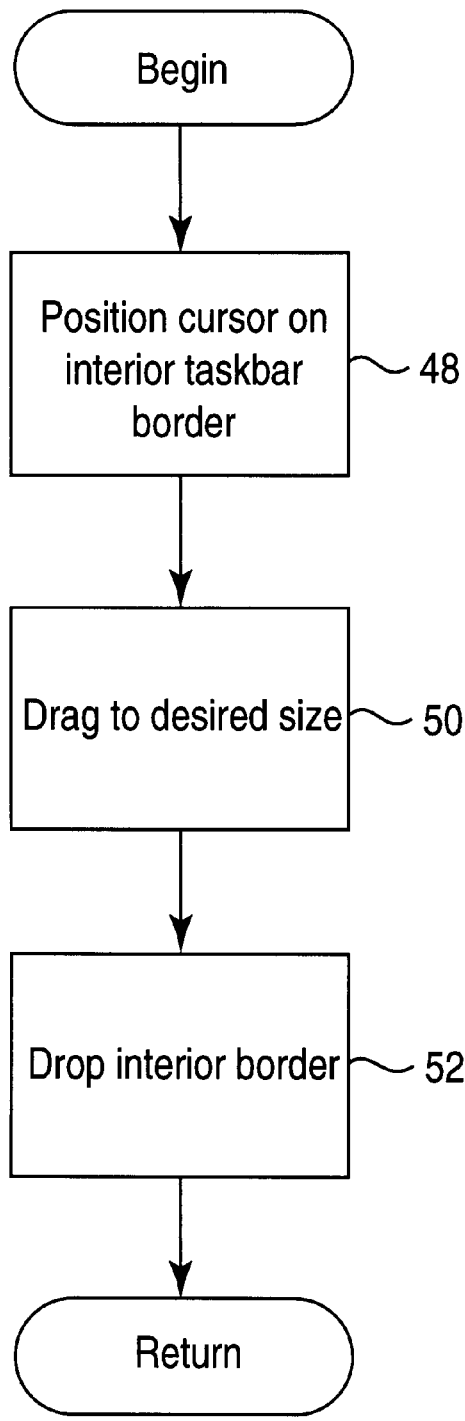
FIG. 6 is a flowchart illustrating the steps that are performed to resize the taskbar.
Figure 7:
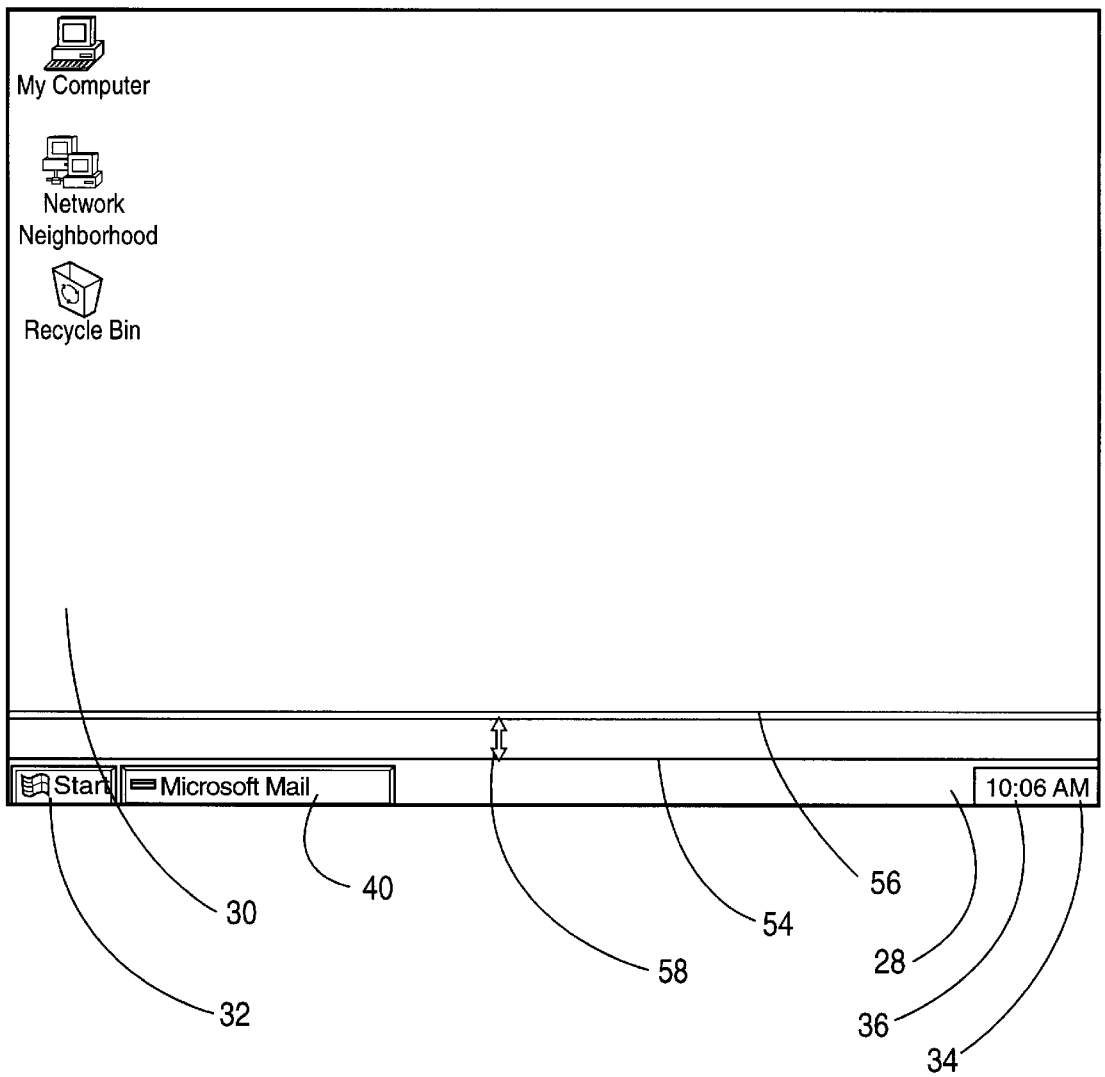
FIG. 7 is a diagram illustrating an example of the appearance of the taskbar when it is being resized.

A user may move the interior border of the taskbar 28 to increase or decrease the size of the taskbar. The interior border is the border that faces in towards the rest of the graphical user interface. In the example shown in FIG. 7, the interior border 54 is the top border of the taskbar 28. A user may reposition the interior taskbar border at discrete increments (i.e., discrete increments of the minimal height shown in FIG. 7) by performing the steps shown in FIG. 6. Initially, a user positions the cursor to point at the interior taskbar border (step 48). The conventional pointing arrow cursor (like cursor 41 shown in FIG. 3) then changes to a double-arrowed cursor to indicate the position to move the interior border of the taskbar. The user then depresses the left mouse button, drags the taskbar to the desired size (step 50) and drops the interior border by releasing the left mouse button to resize the taskbar (step 52). As shown in FIG. 7, a phantom border 56 is displayed during the drag and drop operation to indicate the proposed new interior border position given the current position of the double arrowed cursor 58.

Figure 8:
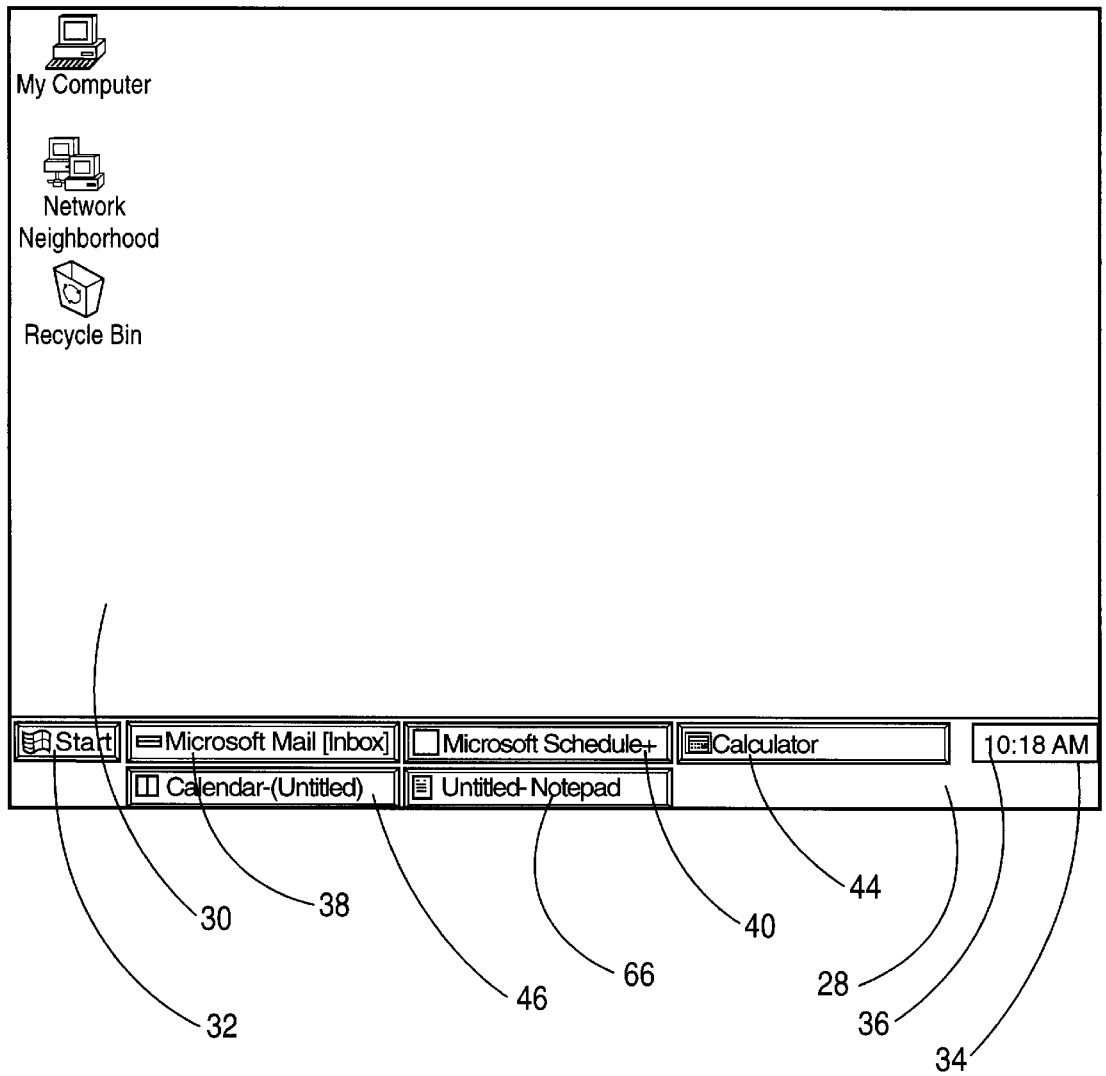
FIG. 8 shows an example of the appearance of a taskbar of a different size than the taskbar of FIG. 7.

As mentioned above, the interior border may only be moved to discrete positions that are determined based upon the current position of the double arrowed cursor 58. Moreover, the interior border may only be moved to a maximum position wherein if dropped, the taskbar would occupy at most half of the graphical user interface. FIG. 8 shows an example of the taskbar 28 as it appears after it has been expanded by dragging the interior border to double the size of the taskbar as depicted in the earlier figures. As the taskbar 28 is a window, the resizing of the taskbar is handled like the resizing of other windows. The taskbar process in the operating system 26 which is responsible for managing and displaying the taskbar 28 receives the mouse messages regarding the drag and drop operation and resizes the taskbar window accordingly.

Figure 9:
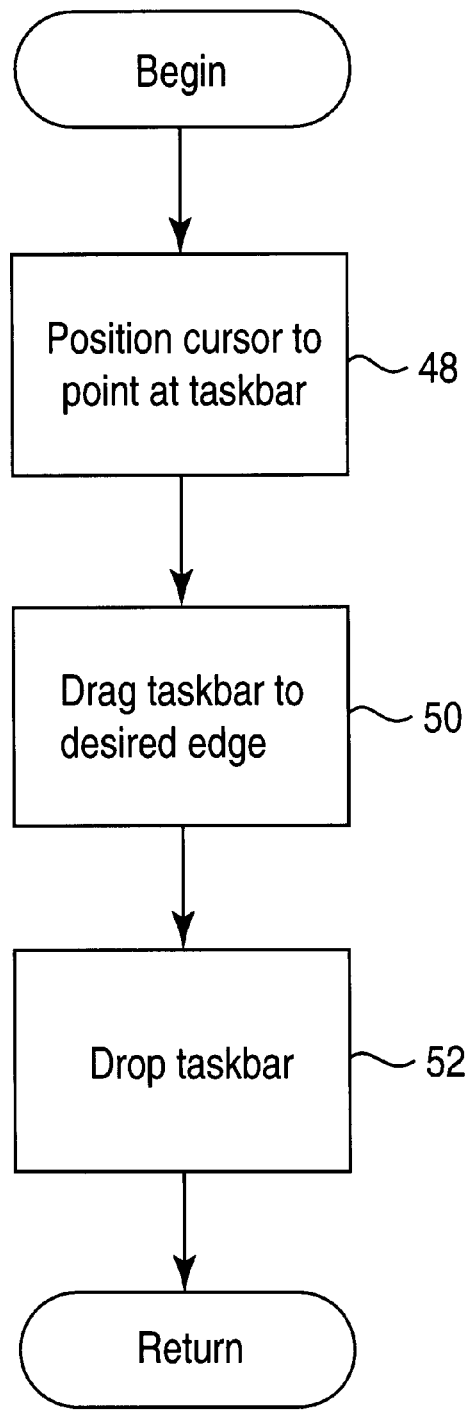
FIG. 9 is a flowchart illustrating the steps that are performed to reanchor the taskbar to a new edge of the video display.
Figure 10A:
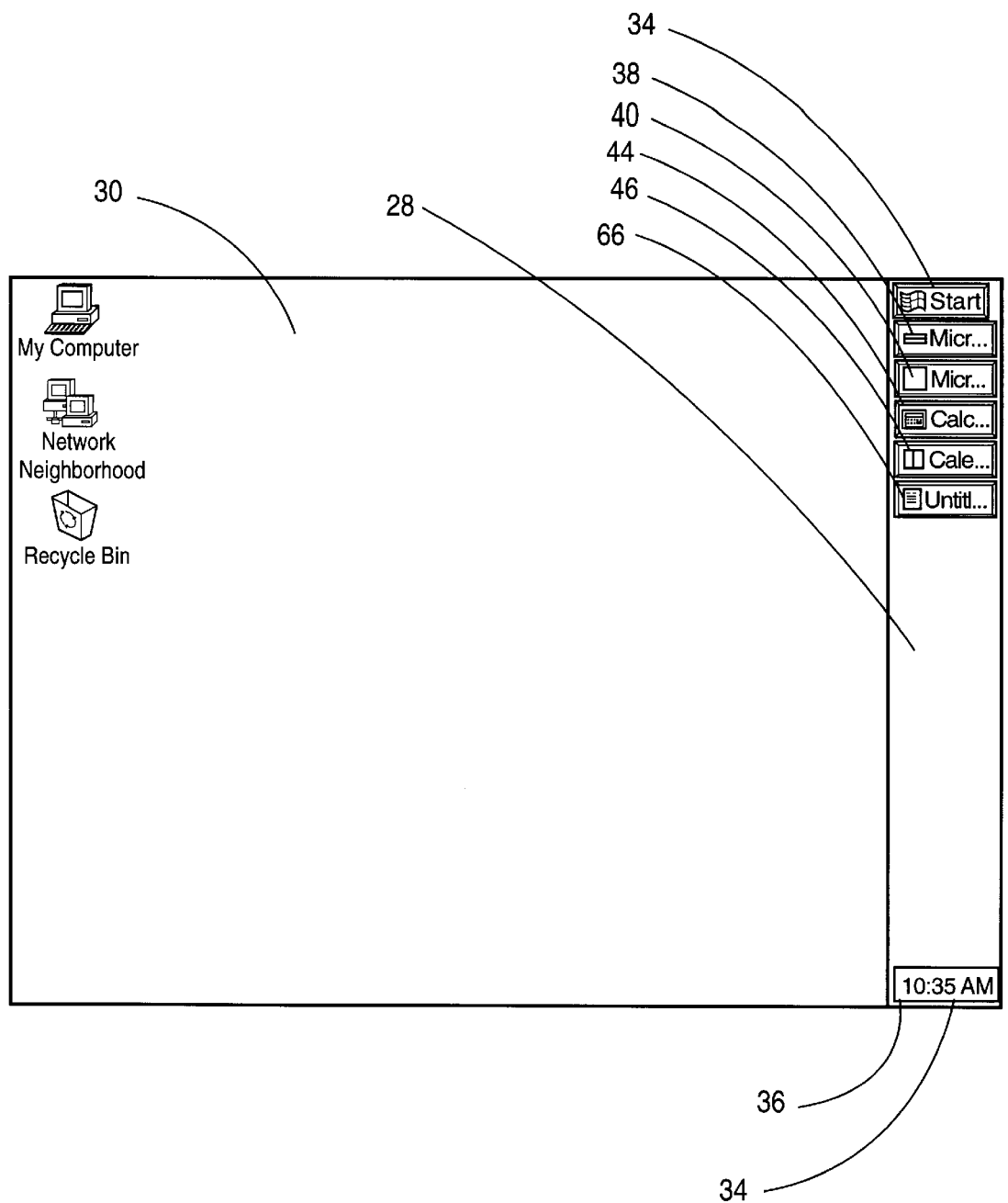
FIG. 10A illustrates the taskbar when it is anchored to the right edge of the video display.
Figure 10B:
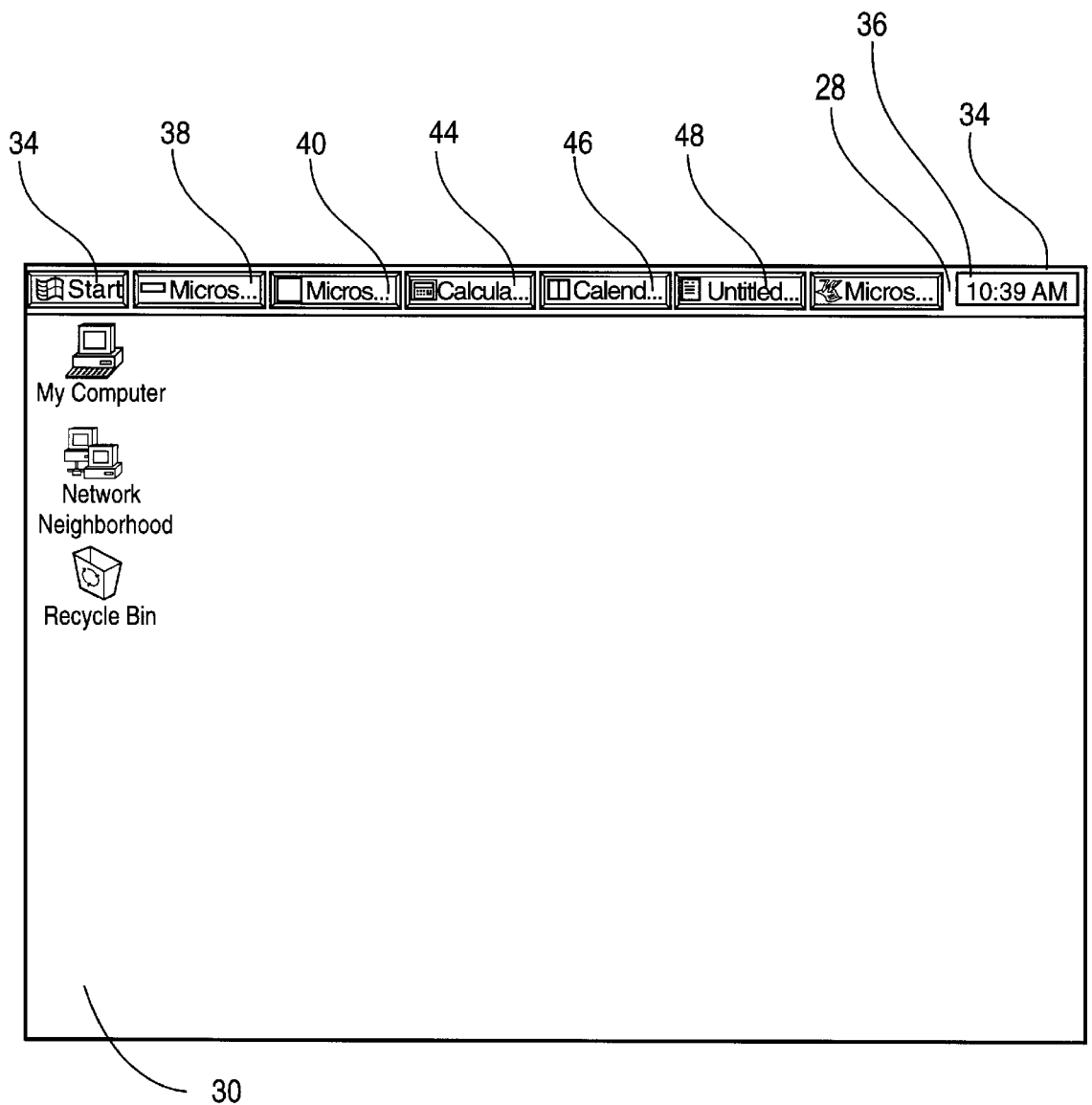
FIG. 10B illustrates the appearance of the taskbar when it is anchored to the top edge of the video display.
Figure 10C:
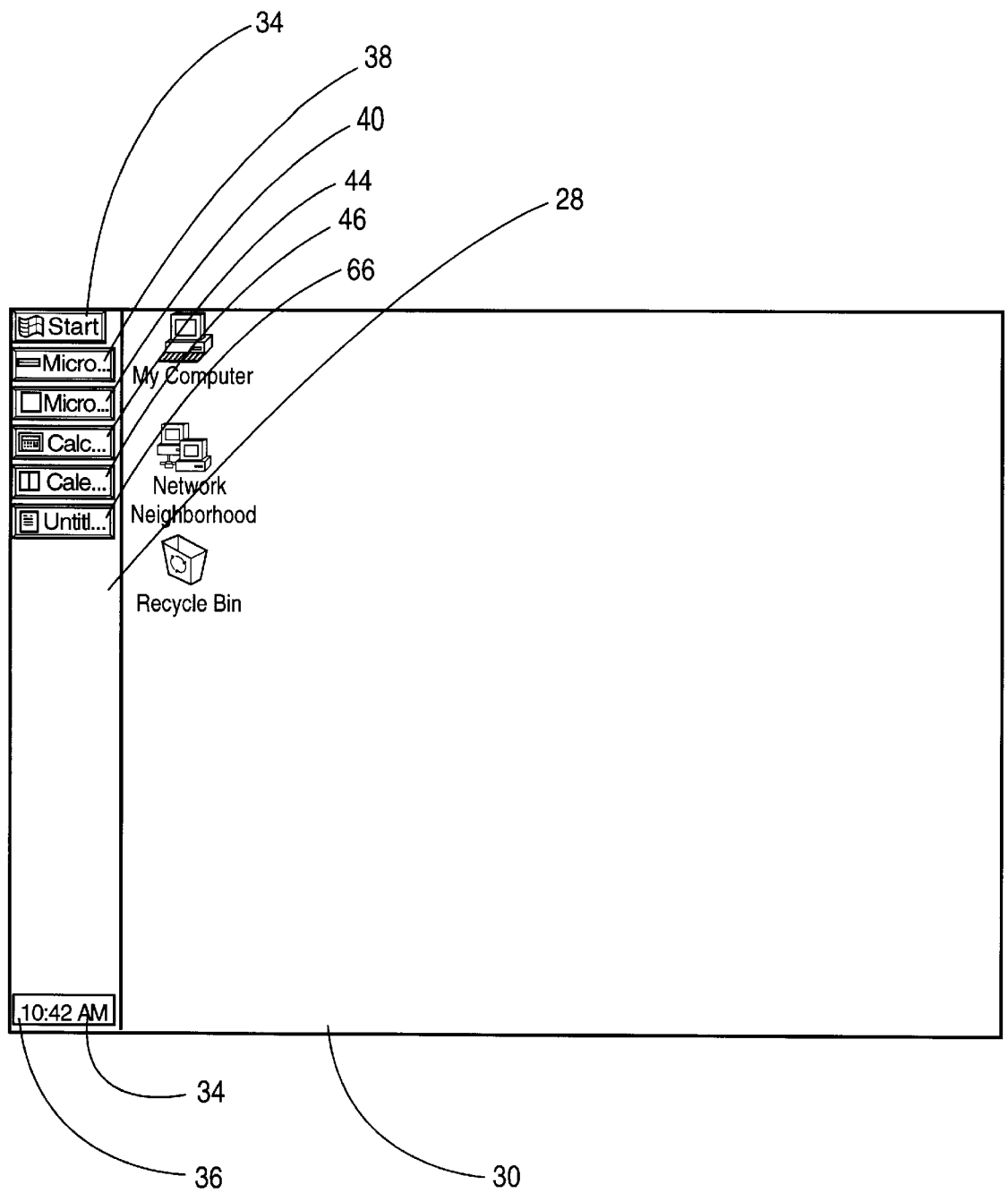
FIG. 10C illustrates the appearance of the taskbar when it is anchored to the left edge of the video display.

As was discussed above, the taskbar may be moved to be anchored at different edges of the video display 18. To move the taskbar 28 to a new anchoring edge, a user performs the steps shown in FIG. 9. In particular, a cursor is positioned to point at a location in the taskbar 28. The left mouse button is then depressed and the taskbar is dragged to the desired edge at which it is to be anchored (step 62 in FIG. 9). The taskbar is then dropped so that it is redrawn and anchored at the appropriate edge (step 64). The system logically divides the screen into quadrants. Each quadrant is associated with an edge. The taskbar is anchored to the edge associated with the quadrant in which the mouse cursor hot spot lies at the time of the drop. FIG. 10A shows the taskbar of FIG. 8 as it appears when dragged to the right side edge of the video display 18. It is worth noting that buttons 38, 40, 44, 46 and 66 are redrawn and repositioned based upon where the taskbar is anchored. The taskbar buttons are drawn so as to extend horizontally for each anchoring edge. Start menu button 34 and clock and taskbar notification area are also repositioned accordingly. FIG. 10B shows an example of the appearance of the taskbar 28 when it is dragged to the top of the video display 18, and FIG. 10C shows an example of the appearance of the taskbar 28 when it is dragged to be anchored to the left edge of the video display 18.

Figure 11:
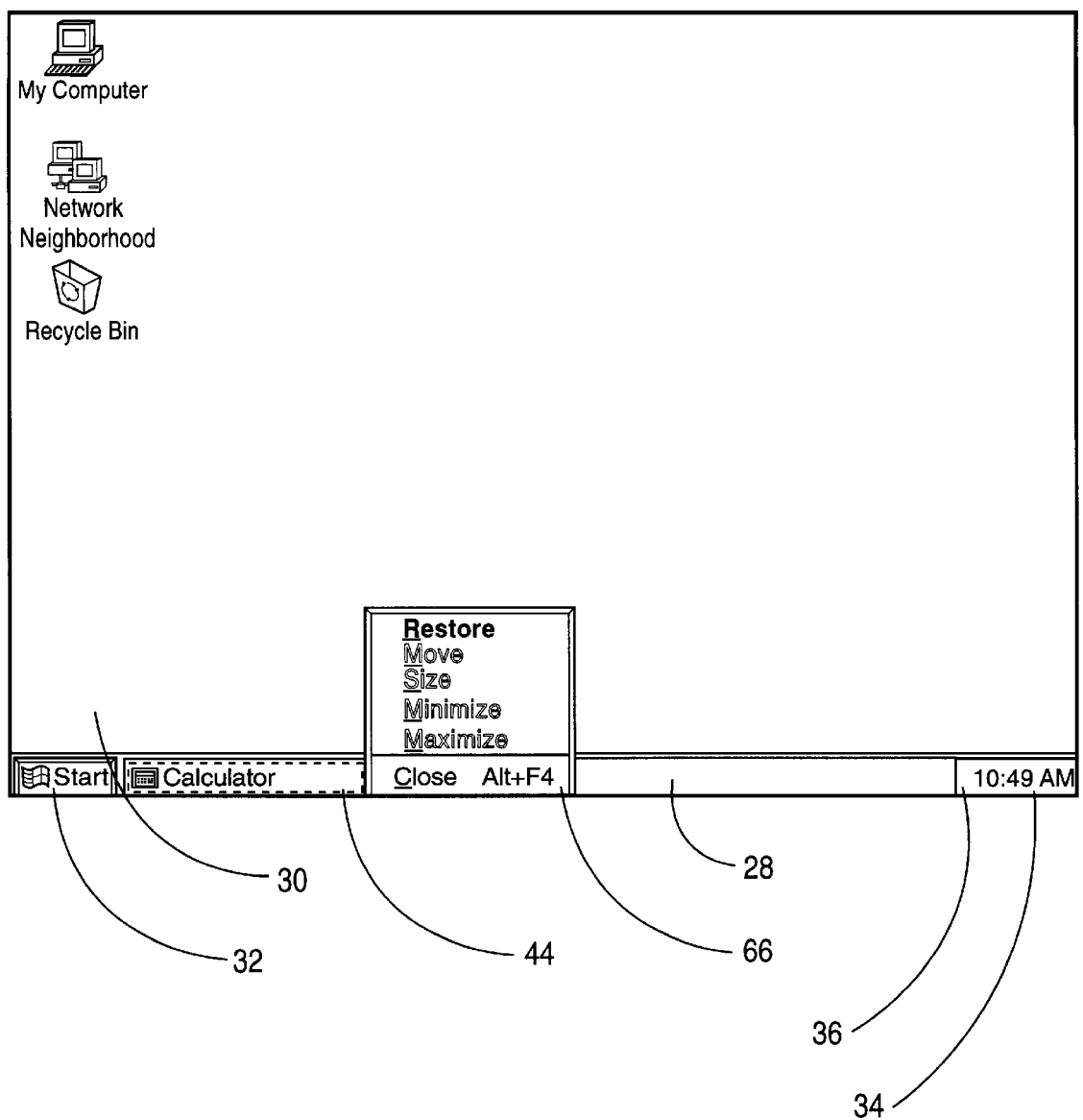
FIG. 11 illustrates an example context menu for a taskbar button.

When a user positions a mouse cursor to point at one of the taskbar buttons and then depresses the right mouse button, a context menu is displayed. FIG. 11 shows an example of a context menu 66 that is displayed when the mouse cursor is positioned to point at taskbar button 44 and the right mouse button is depressed. The context menu 66 allows a user to select from different context-sensitive operations that may be performed on the window associated with the taskbar button. For example, the context menu 66 includes an option to "Close" the window that is associated with taskbar button 44.

Figure 12:
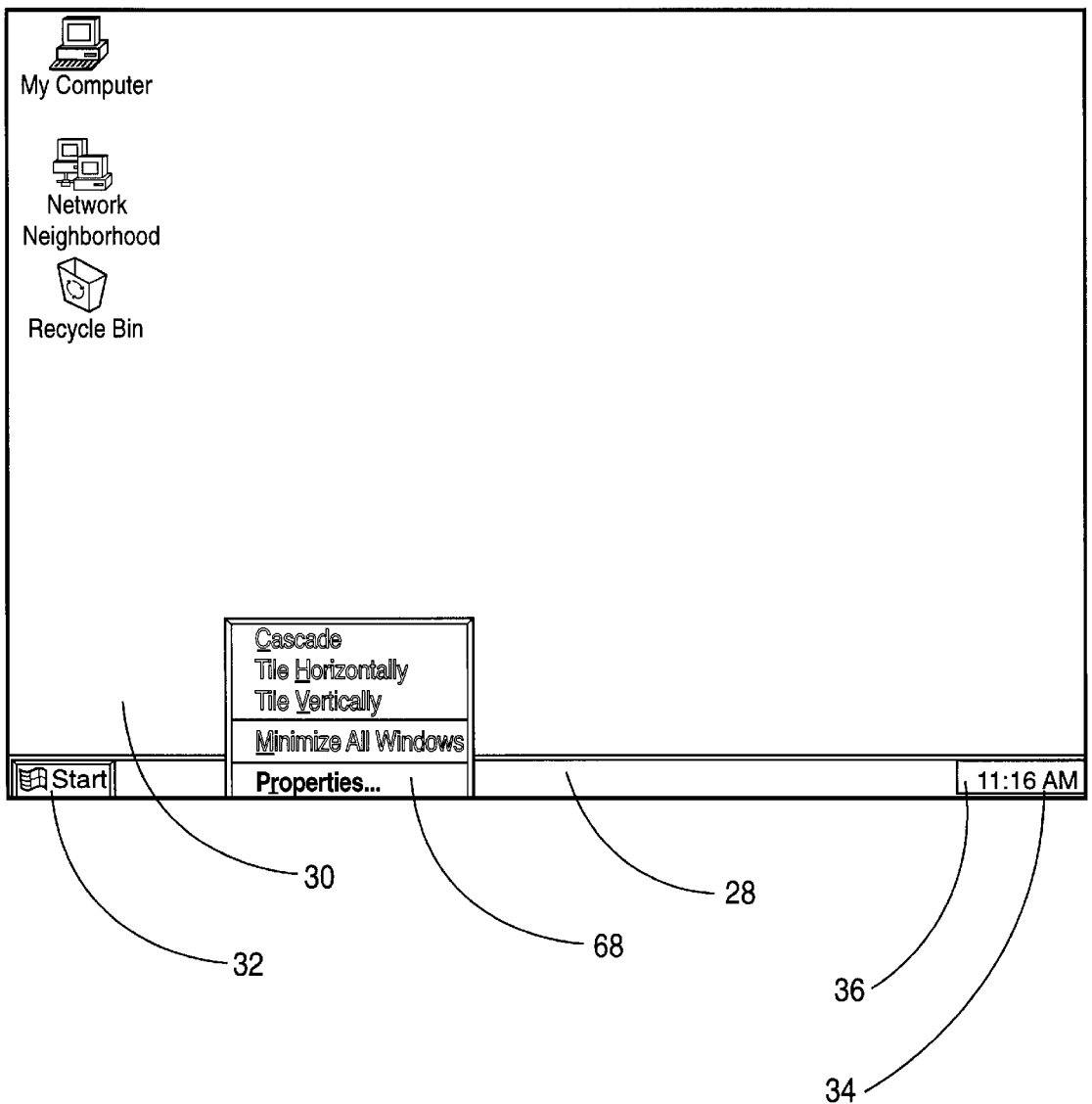
FIG. 12 illustrates an example context menu for the taskbar.

A context menu 68 (FIG. 12) is also provided for the taskbar 28. This taskbar 28 is displayed when a user positions a mouse cursor to point at the taskbar and depresses the right mouse button. The context menu 68 includes a "Cascade" option for cascading open windows. The context menu 68 for the taskbar also includes a "Tile Horizontally" option for horizontally tiling open windows. A "Tile Vertically" option is also provided in the context menu 68 to vertically tile open windows. These operations are performed using conventional techniques. The "Minimize All Windows" option minimizes all currently open windows so that they appear as taskbar buttons on the taskbar 28. The operating system 26 includes the notion of a definable work area that is usable to the user. The windows are minimized so as to not lie in the work area. Hence, they are not visible to the user. The taskbar is also informed of the minimization request and knows to update the taskbar buttons for each of the windows so that the buttons appear raised.

Figure 13:
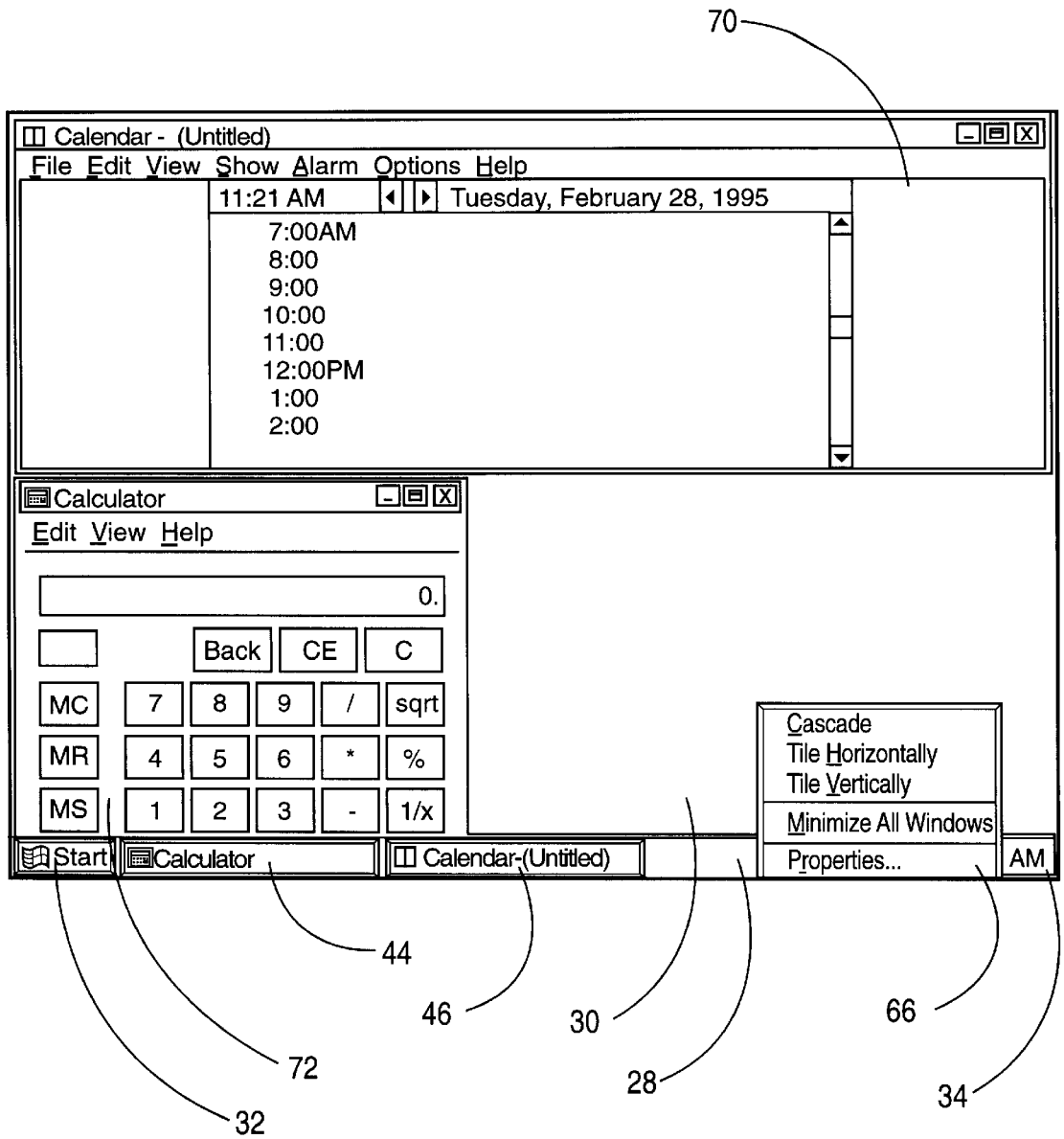
FIG. 13 illustrates an example context menu for the taskbar when a window tiling option has been chosen.

The context menu 68 may also include an "Undo Tile" option for undoing the previously selected windows tiling option as shown in FIG. 13. For the example case shown in FIG. 13, a window 70 for a calendar program and a window 72 for a calculator program are currently open. The "Tile Vertically" option has been selected. The windows may be displayed as they were previously displayed before the request to tile them vertically was made by choosing the "Undo Tile" option in the context menu 68. The system achieves this undo tiling effect by recording the previously selected windows tiling option and reinstituting that tile option after the undo is requested.

Figure 14:
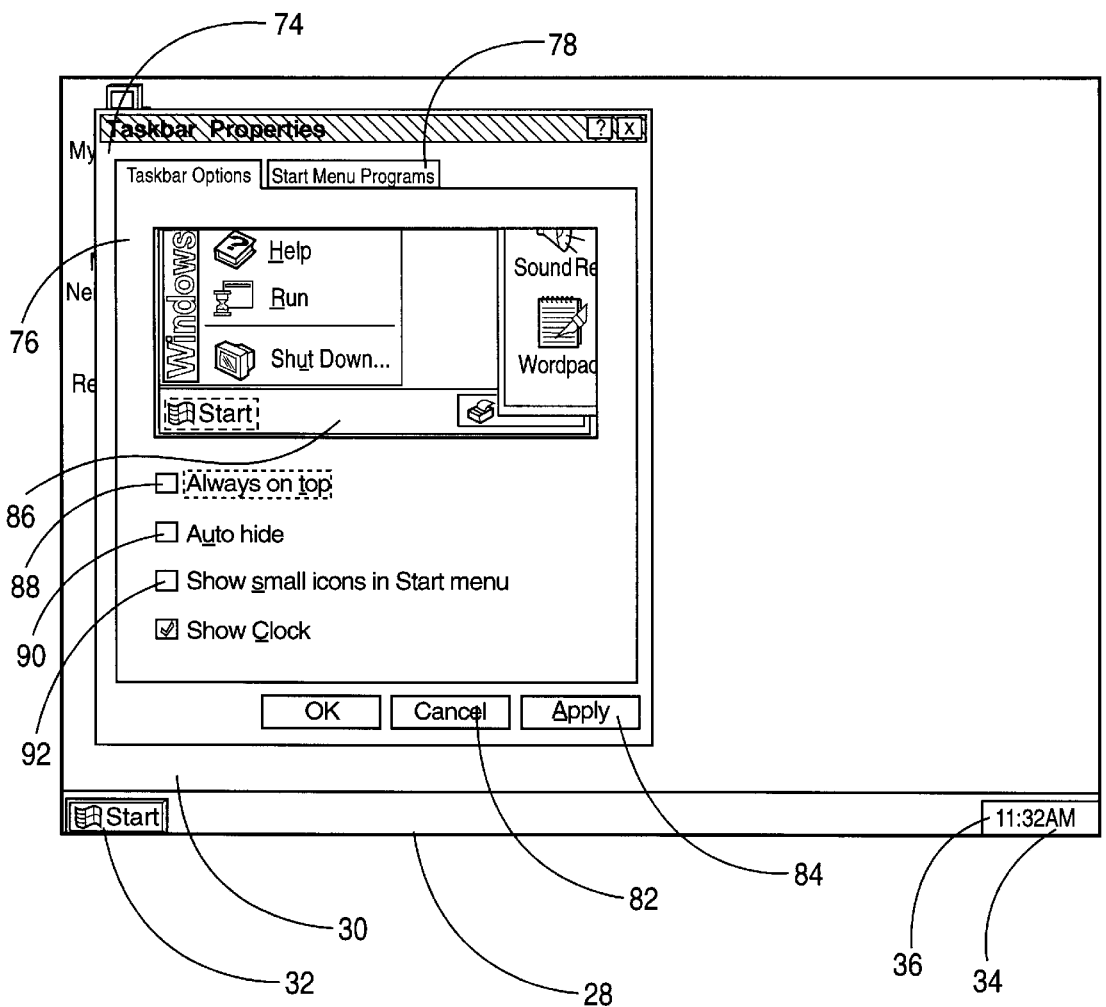
FIG. 14 illustrates the "Taskbar Options" property sheet for the taskbar.

A final option on the taskbar context menu 68 is the "Properties" option, which may be selected to display property sheets for the taskbar 28 and start menu. FIG. 14 shows what is displayed when the "Properties" option is selected from the taskbar or context menu 68. A frame window 74 labeled as "Properties for Taskbar" is displayed. The frame window 74 is used to hold property sheets, like a frame. A property sheet 76 for "Taskbar Options" is displayed in the frame window 74, along with a tab 78 for a "Start Menu Programs" property sheet. The window includes an OK button 84 accepting user-made property changes, a Cancel button 82 for not accepting user-made property changes and an Apply button 84 for immediately applying changes that have been made while keeping the frame window 74 open.

Figure 15A:
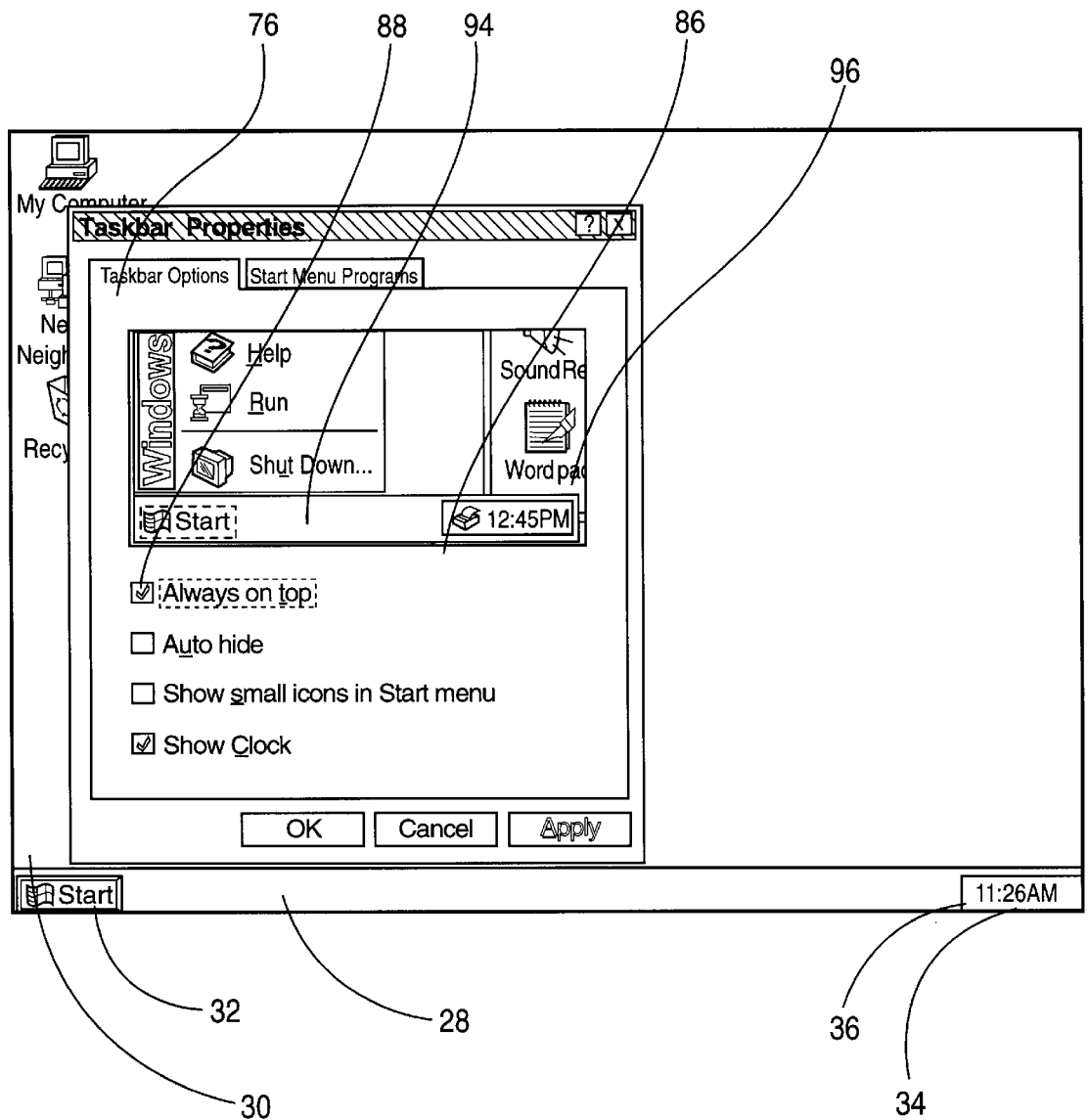
FIG. 15A illustrates the effect of choosing the "Always on top" check box in the property sheet of FIG. 14.

The "Taskbar Options" property sheet 76 includes a preview area 86 that illustrates the effect of selecting or not selecting check boxes 88, 90 and 92. FIG. 15A shows an example wherein the "Always on top" check box 88 has been checked so that the taskbar is always displayed on top of other components in the user interface. The preview area 86 of the property sheet 76 shows that the illustrated portion of the taskbar 94 is positioned to obscure the window 96. This appearance is in contrast to the appearance of the taskbar in the preview area 86 of FIG. 14, where the taskbar is obscured by the window.

Figure 15B:
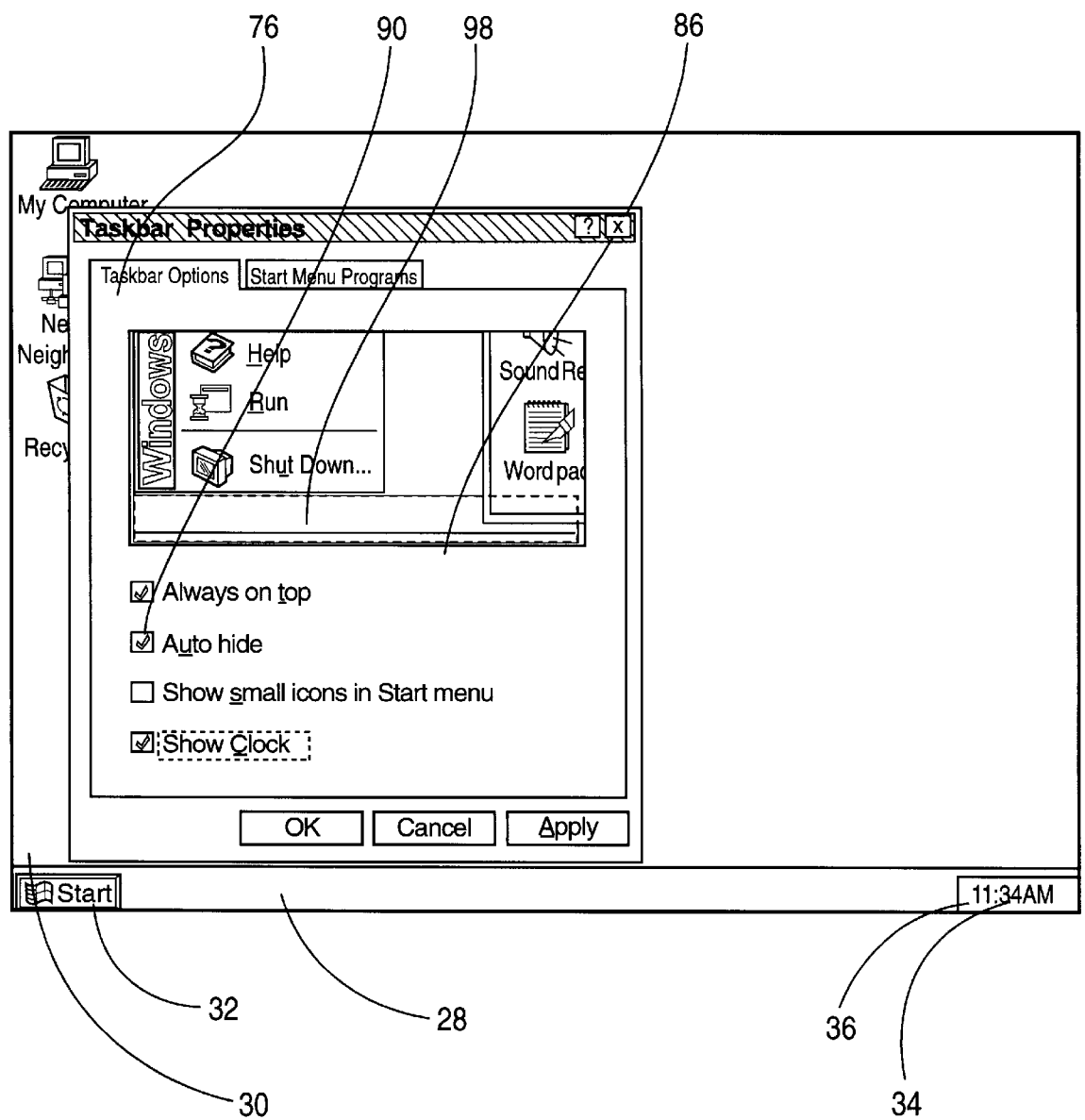
FIG. 15B illustrates the effect of selecting the "Auto hide" check box in the property sheet of FIG. 14.

FIG. 15B illustrates an example wherein the "Auto hide" check box 90 has been selected so as to place the taskbar in auto hide mode. As the preview section 86 of the property sheet 76 indicates, in auto hide mode, the taskbar is not readily visible. Only a small sliver 98 of the taskbar is visible. The auto hide option is provided to allow users to exploit more of the available screen space on the video display 18 when needed.

The auto hide mode hides the taskbar. The taskbar 28 is hidden when a user opens a window on the desktop. When no more opened windows remain, the task bar reappears. In addition, a user may cause the taskbar to reappear when a window is opened by positioning the mouse cursor to point along the edge of the video display to which a taskbar is anchored. The taskbar disappears when the user moves the cursor out of this area. Programmatically, the auto hide mode is instituted by the taskbar monitoring where the windows are opened and determining when to display the bar and when to hide the task bar.

Figure 15C:
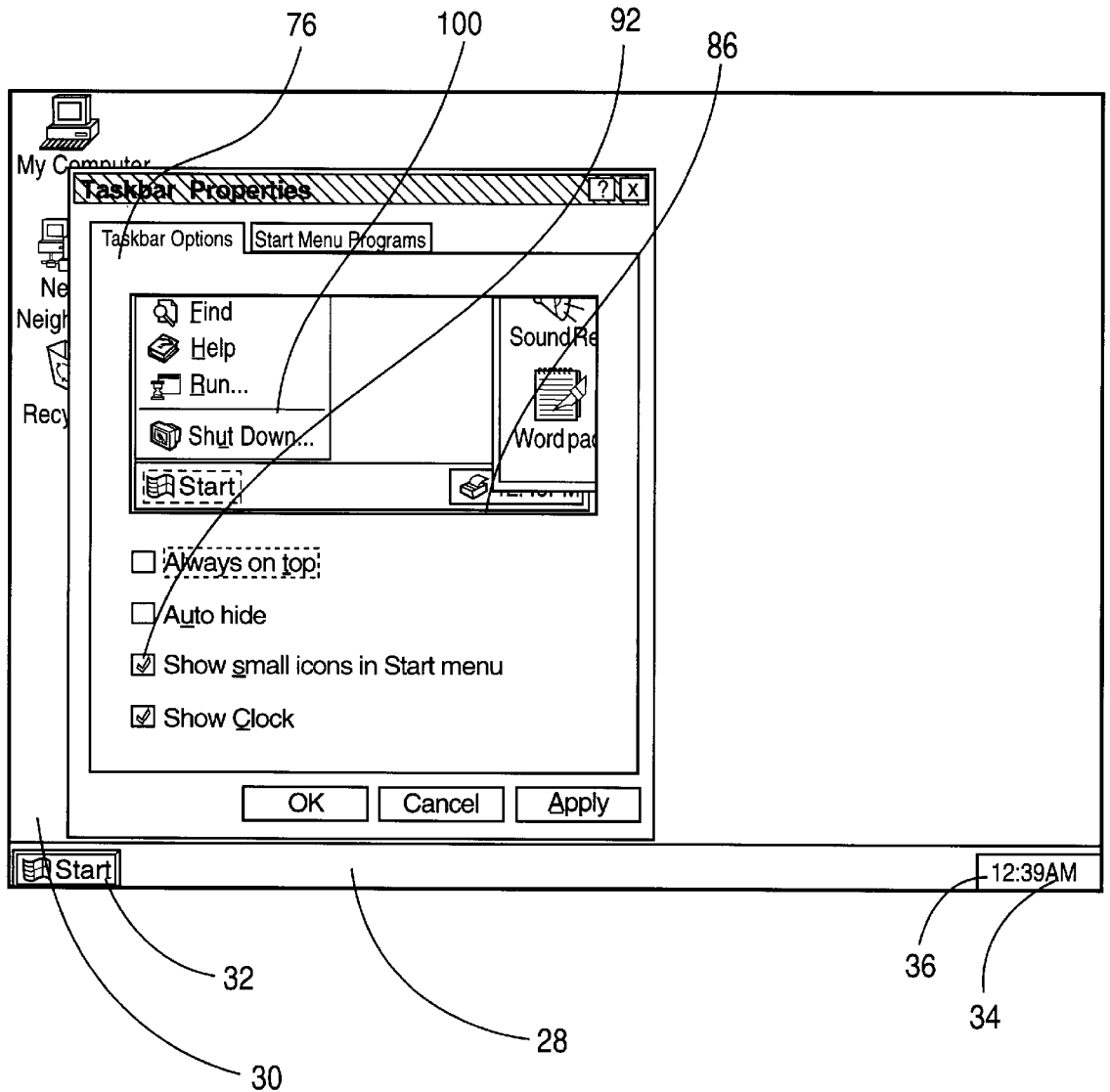
FIG. 15C illustrates the effect of choosing the "Show small icons in Start menu" check box in the property sheet of FIG. 14.

FIG. 15C shows an example wherein the "Show small icons in Start menu" list box 92 has been selected to show small icons in the start menu rather than large icons. The system provides the icons in two varieties: small and large. Small icons, as the name implies, differ from the large icons in that they are smaller in dimension. When check box 92 is checked, the preview area 86 of property sheet 76 shows small icons in the start menu 100.

Figure 16A:
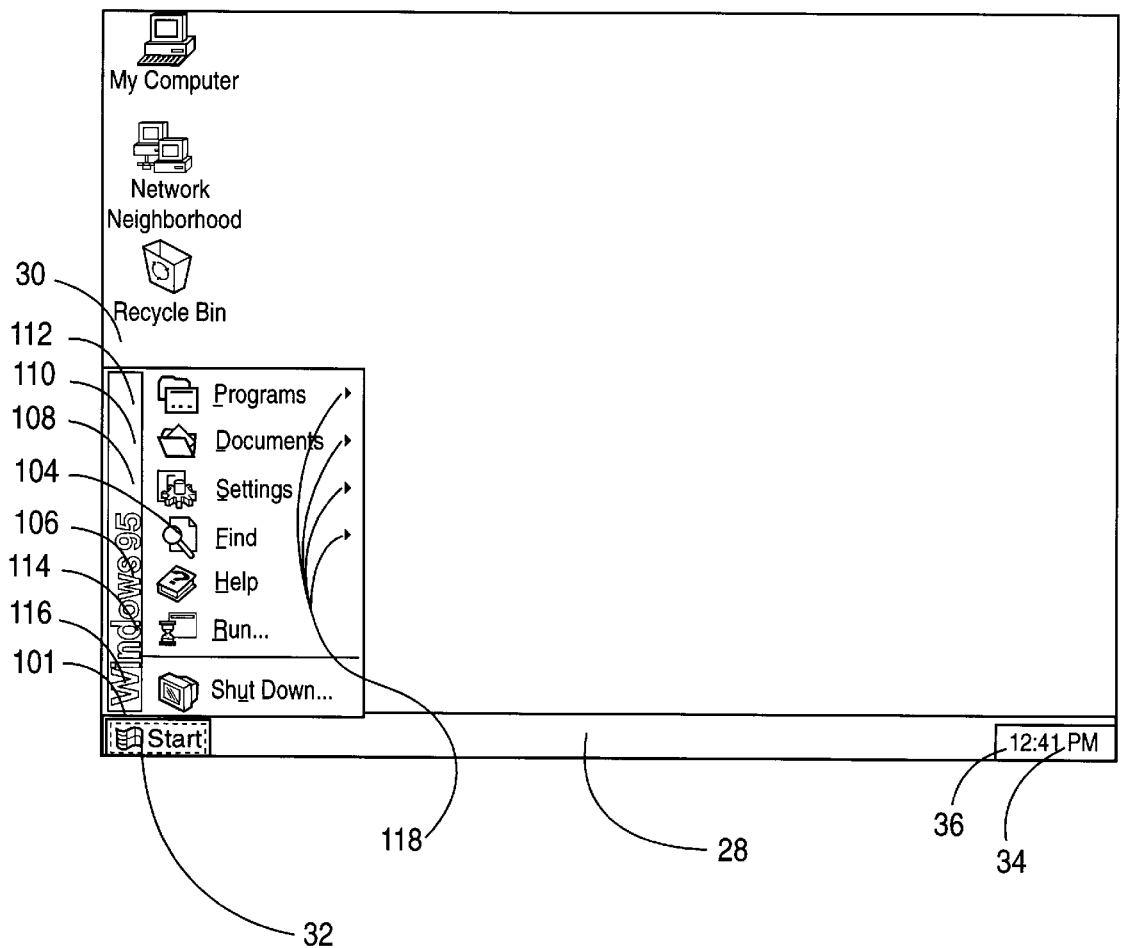
FIG. 16A illustrates an example of a start menu in accordance with the preferred embodiment of the present invention.

The start menu button 32 serves as the vehicle for opening the start menu. The start menu acts as a centralized place for a user to gain access to programs, documents, system settings, help information and the like. A user causes the start menu 101 (FIG. 16A) to be displayed by positioning the mouse cursor to point at the start menu button 32 and then clicking the left mouse button. The start menu 101, by default, includes a number of menu items. The "Find" menu item 104 allows a user to invoke a querying dialog to locate programs, documents or other entities within the system. The "Help" menu item 106 invokes a menu dialog that allows a user to find useful help information about various topics. Thus, if a user needs help or needs to find something, the user needs only to access the start menu 12 and choose one of these menu items.

Figure 16B:
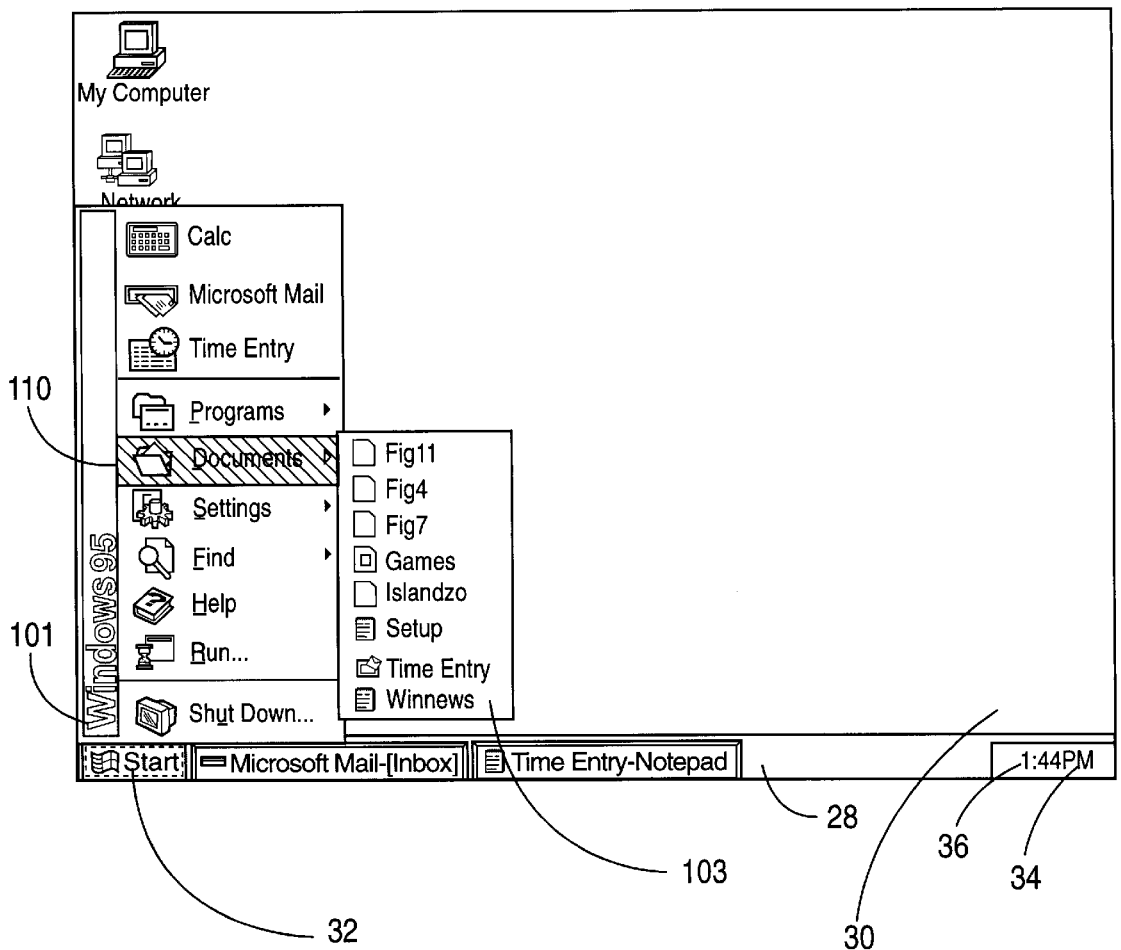
FIG. 16B illustrates an example of a cascading documents menu that may be accessed via the start menu.

The "Settings" menu item 108 allows a user to adjust system settings. The "Documents" menu 110 allows a user to gain access to up to fifteen of the most recently used documents. FIG. 16B shows an example where cascade menu 103 is shown displaying three documents when the "Documents" menu item is selected. The system 16 maintains a cache of the 15 most recently opened documents and icons for these documents. A menu item for the documents on this list are displayed when the "Documents" menu item 110 is selected.

Figure 16C:
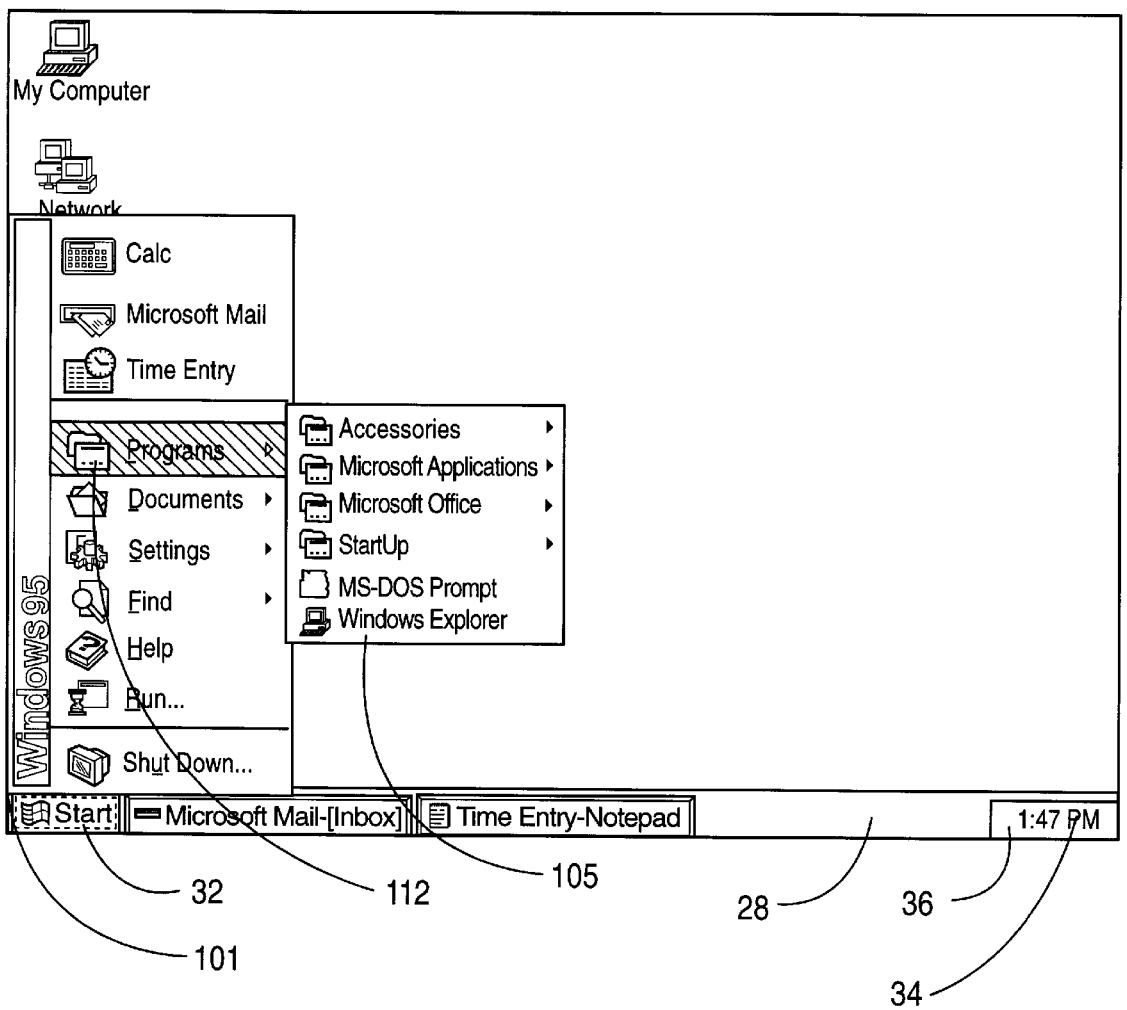
FIG. 16C illustrates a cascading programs menu that may be accessed via the start menu.

The "Programs" menu item 112 allows a user to gain access to the programs menu 105 (FIG. 16C) that cascades off the start menu 101. The programs menu 105 displays programs and program groups that a user may select. The "Run" menu item 114 enables a user to select a program to run. Lastly, the "Shut Down" menu item 116 displays a shut down dialog to allow a user to shut down the system. The arrows 118 shown for menu items 104, 108, 110, and 112 indicate that these menu items have cascading menus that are displayed when the mouse cursor is positioned to point at these items.

Figure 17:
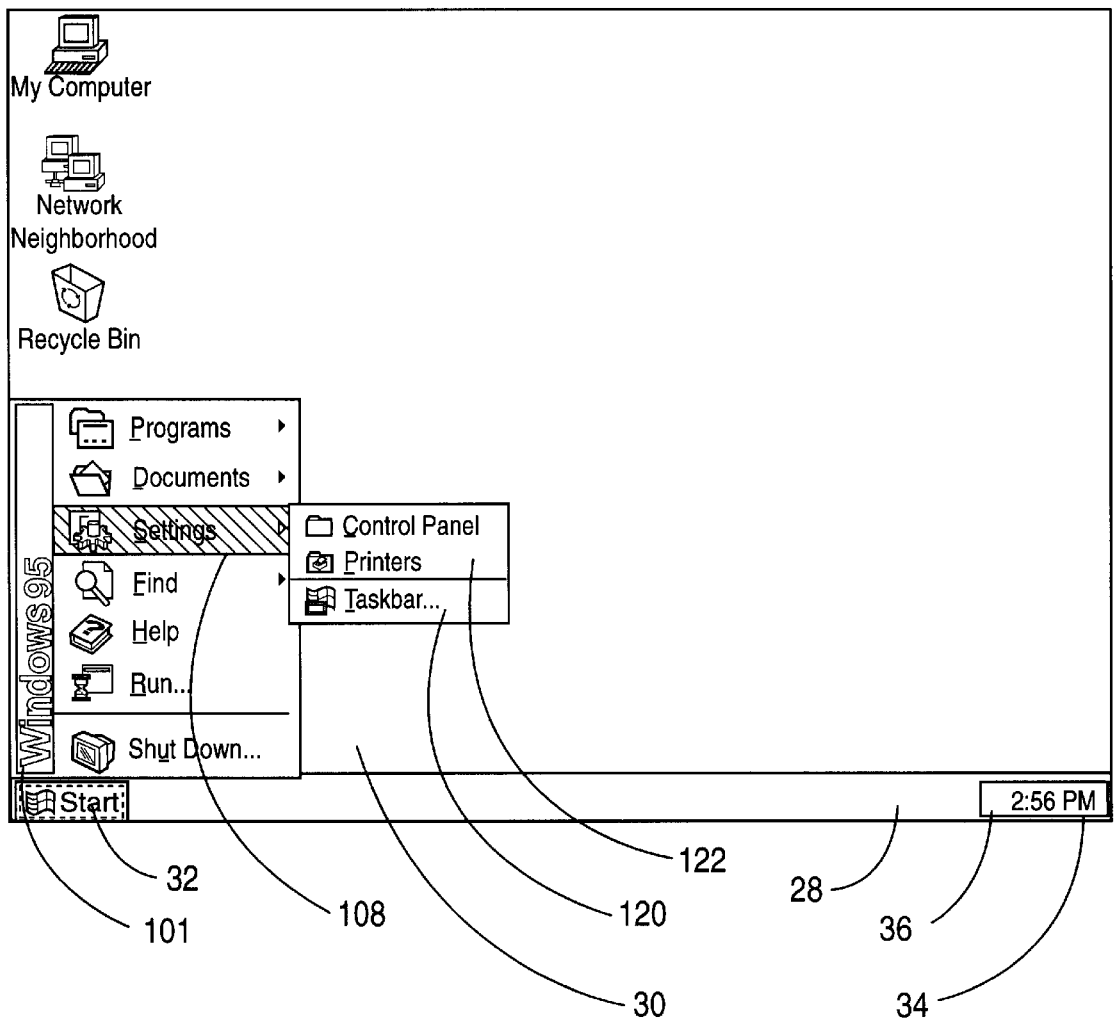
FIG. 17 illustrates a cascading settings menu that may be accessed via the start menu.
Figure 18:
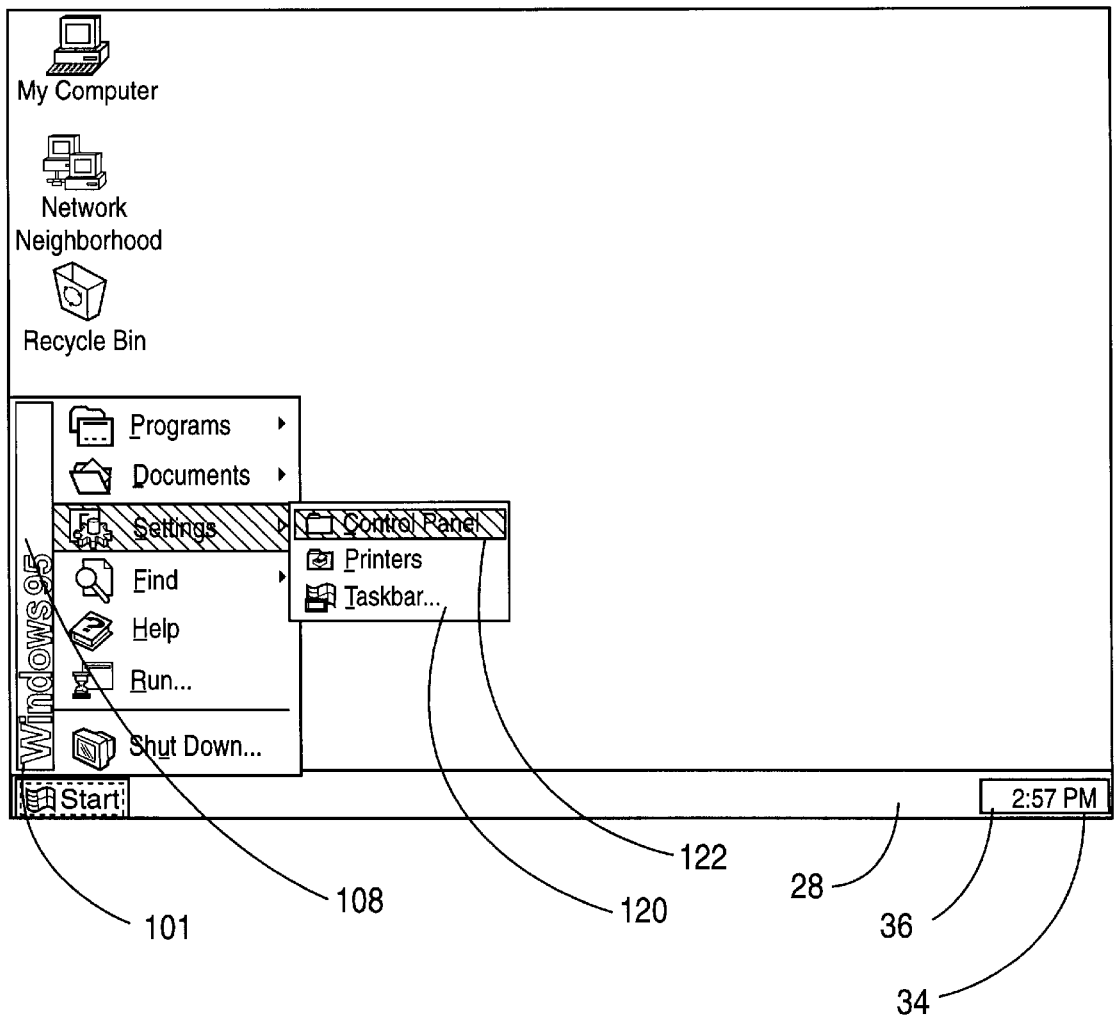
FIG. 18 illustrates an instance wherein a "Control Panel" option is selected in the cascading settings menu of FIG. 17.
Figure 19:
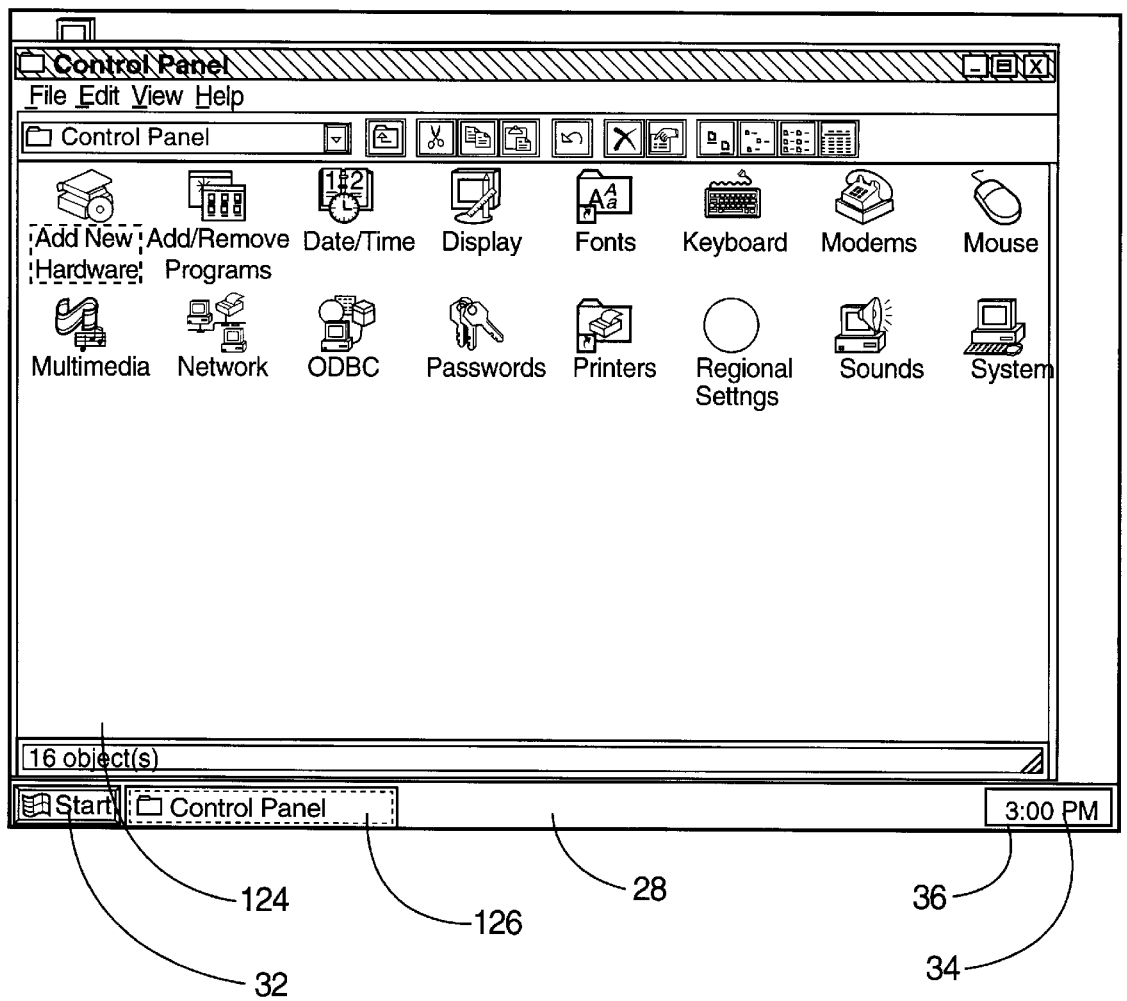
FIG. 19 illustrates an open control panel window that is accessed via the cascading settings window of FIG. 18.

FIG. 17 shows an example of a cascading menu 120 for the "Settings" menu item 108 in the start menu 101. When the mouse cursor is positioned to point at one of the menu items in the start menu 101, the item is highlighted. In FIG. 17, the "Settings" menu item 108 is highlighted, and the corresponding cascading menu 120 is displayed to show the user the available setting options. These settings options include an option 122 for opening a control panel window. These options are highlighted as the mouse cursor is positioned to point at them. In the example shown in FIG. 18, the control panel option 122 is shown highlighted. The user may then open the control panel window 124 (as shown in FIG. 19) by single clicking the left mouse button while the cursor points to the control panel option 122.

The above described menu items shown in the start menu 101 are displayed by default. A user may configure the start menu to add additional items and to remove certain items. The system provides protections that do not allow a user to remove certain items from the start menu 101. The user may configure the start menu by invoking the "Start Menu Programs" property sheet through the taskbar context menu 68. The "Start Menu Programs" property sheet 128 is displayed in the frame window 74 that was described above relative to the property sheet for the taskbar. The "Start Menu Programs" property sheet 128 includes an add button 130 for adding items to the start menu. A remove button 132 is provided to remove items from the start menu and an advanced button 134 is provided for performing advanced customization of the start menu.

Figure 21:
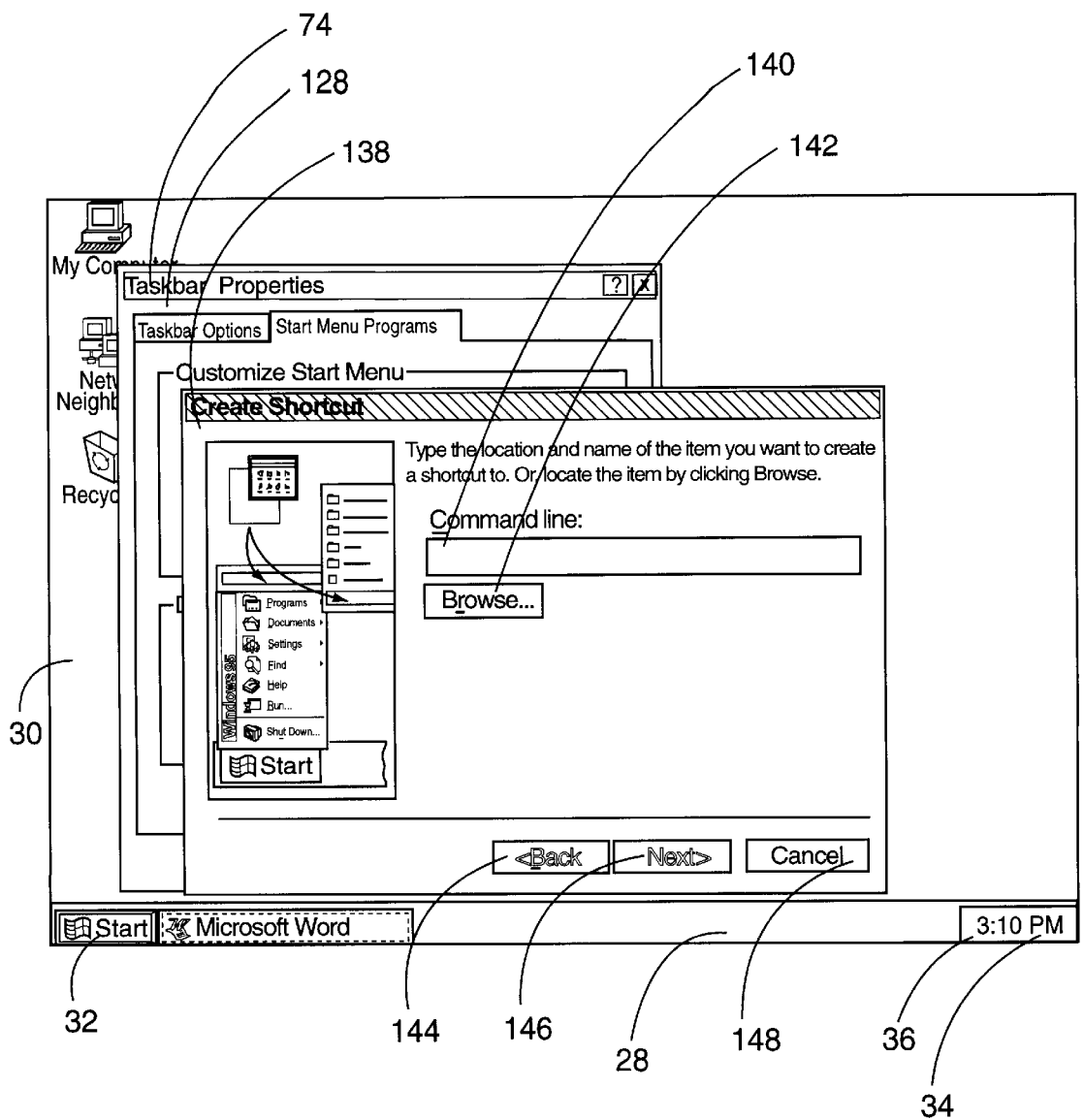
FIG. 21 shows a dialog that may be accessed via an "Add" button on the property sheet of FIG. 20.

When the user presses the add button 130, a dialog 138 that is part of a sequence for adding an item to the start menu is displayed as shown in FIG. 21. The dialog 138 includes an edit box 140 for entering the name of the item to be added. Alternatively, a user may activate a browse button 142 which invokes additional dialogs to enable a user to browse through items to be added. The dialog 138 includes a next button 146 for progressing to a next dialog in the sequence and a back button 144 for returning to the previous dialog in the sequence. Lastly, a cancel button 148 is provided to cancel the addition of an item to the start menu.

Figure 22:
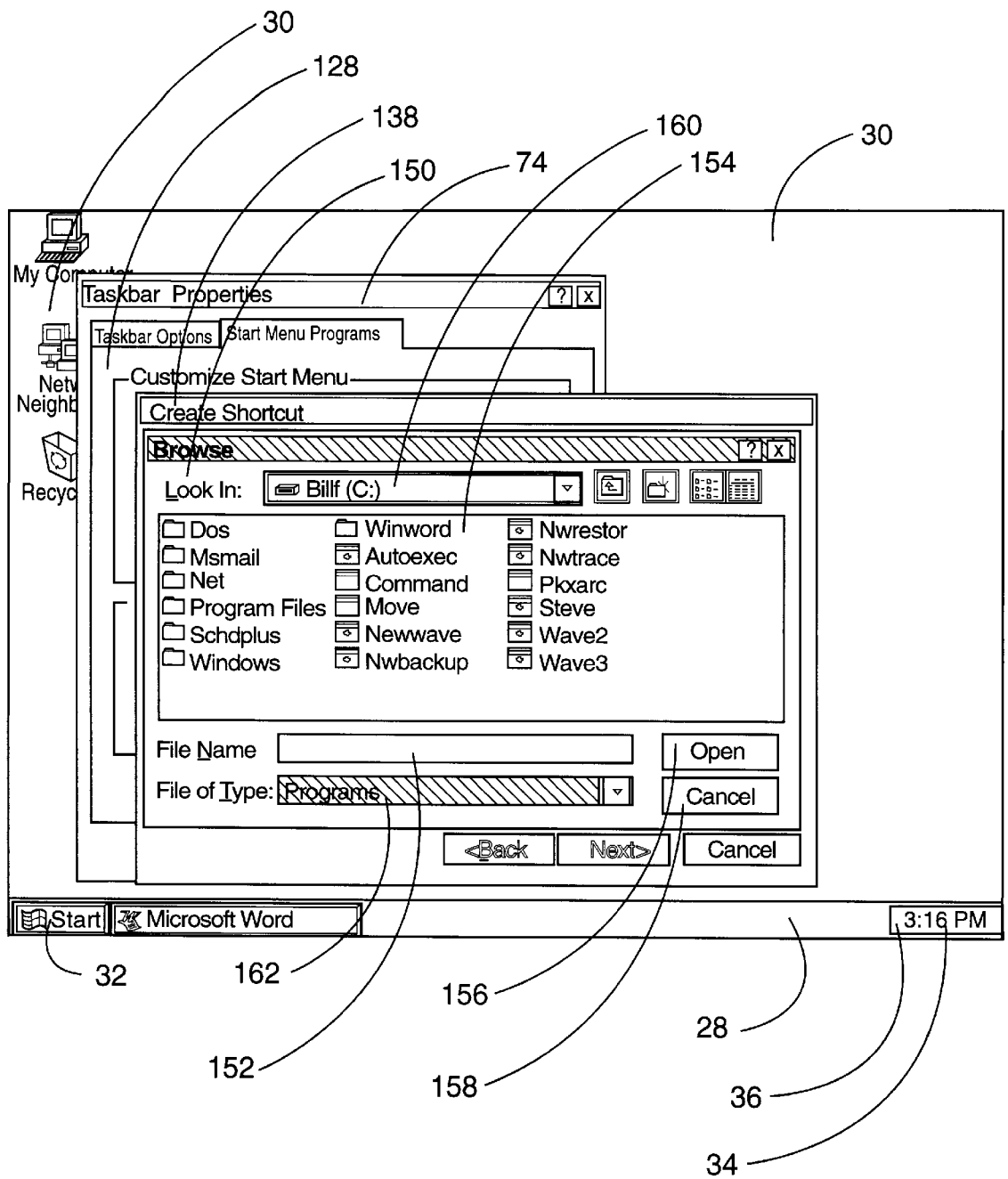
FIG. 22 illustrates a browse dialog for adding an item to the start menu.
Figure 23:
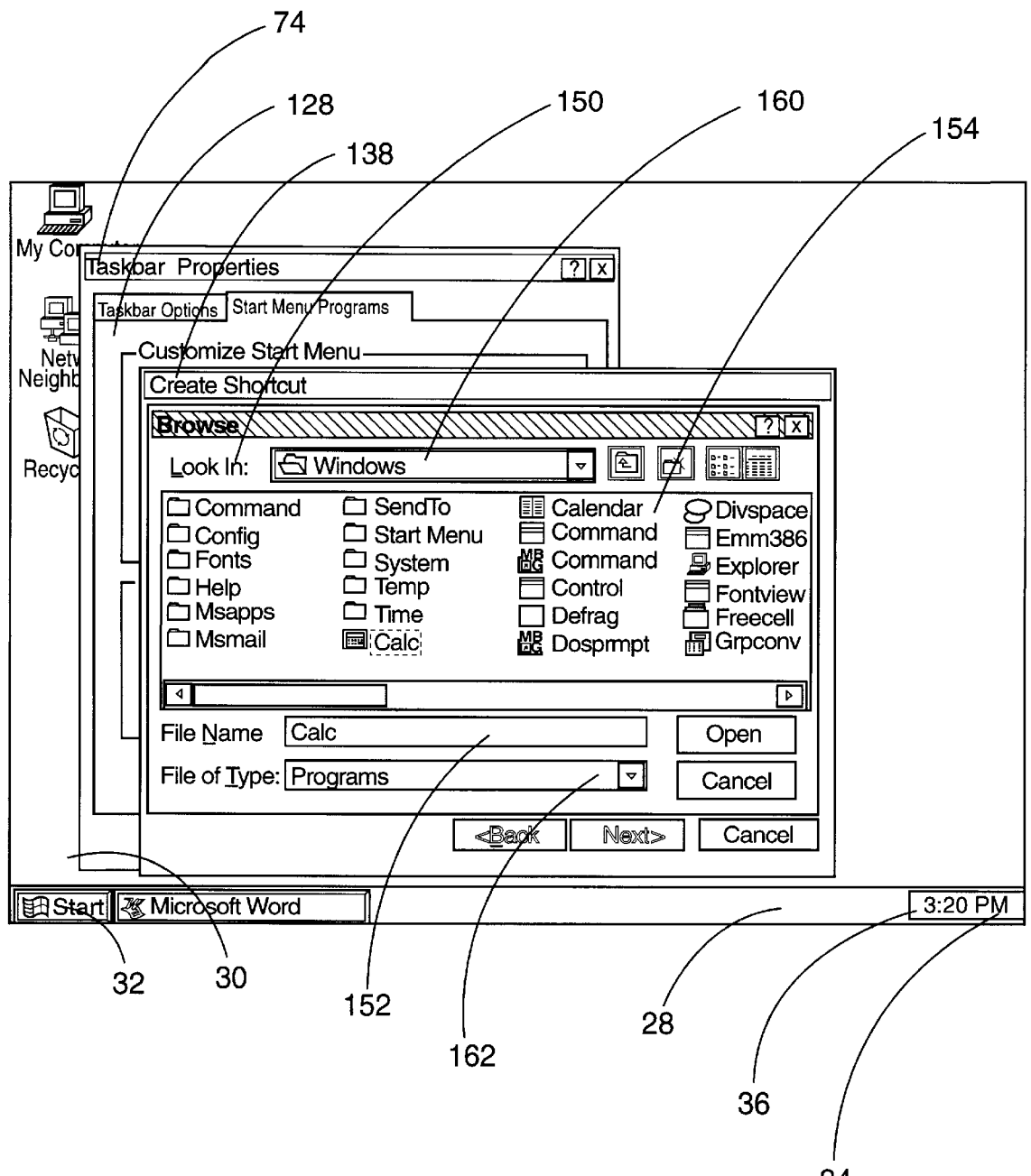
FIG. 23 shows the browse dialog of FIG. 22 when used to select an item to be added to the start menu.

When the user depresses the browse button 142 (FIG. 21) a browse dialog 150 (FIG. 22) is displayed. The browse dialog 150 includes a window 154 which shows folders and items that may be added to the start menu 101. A user may select one of the items displayed within window 154 or may type a file name in edit box 152. The user then depresses the open button 156 to request the selected item to be added to the start menu 101. The user may cancel the browse dialog 150 by hitting the cancel button 158. A drop down list box 160 is provided in the browse dialog 150 to present options regarding the places where the user may look for items to add to the start menu. An additional drop down list box 162 is provided for a user to select the type of file that is to be displayed in window 154. FIG. 23 shows an example wherein a user has chosen the windows folder and selected the "Calc" program to be added to the start menu. In particular, the user has clicked on the icon associated with "Calc." As a result, the name of this file appears in the edit box 152.

Figure 24:
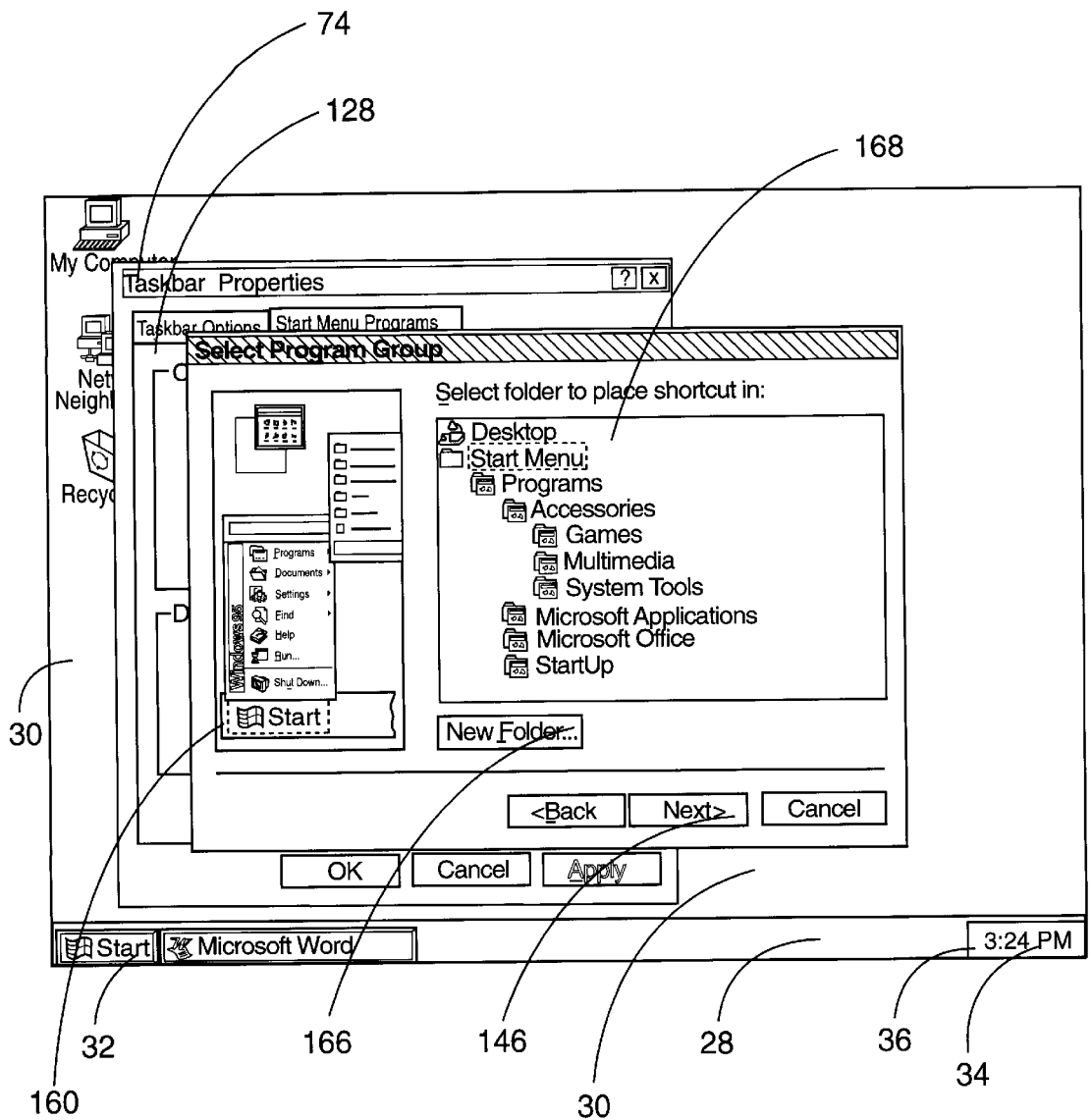
FIG. 24 shows another dialog in a sequence of dialogs for adding an item to the start menu.

When the user presses the open button 156 in the browse dialog 150, a "Select Program Group" dialog 160 is shown. This dialog is used to select to program group to which the item is to be added to within the cascading menus that are accessible from the start menu 101. In the example shown in FIG. 24, a user has selected the start menu 101 as the program group by positioning the mouse cursor to point at the entry for the start menu that is shown in scroll box 168 and clicking the left mouse button. The user also has the option of pressing a new folder button 166 to define a new folder that is to be added to the cascading start menus. When the user depresses the next button 146, the selected item is added to the start menu 101.

Figure 20:
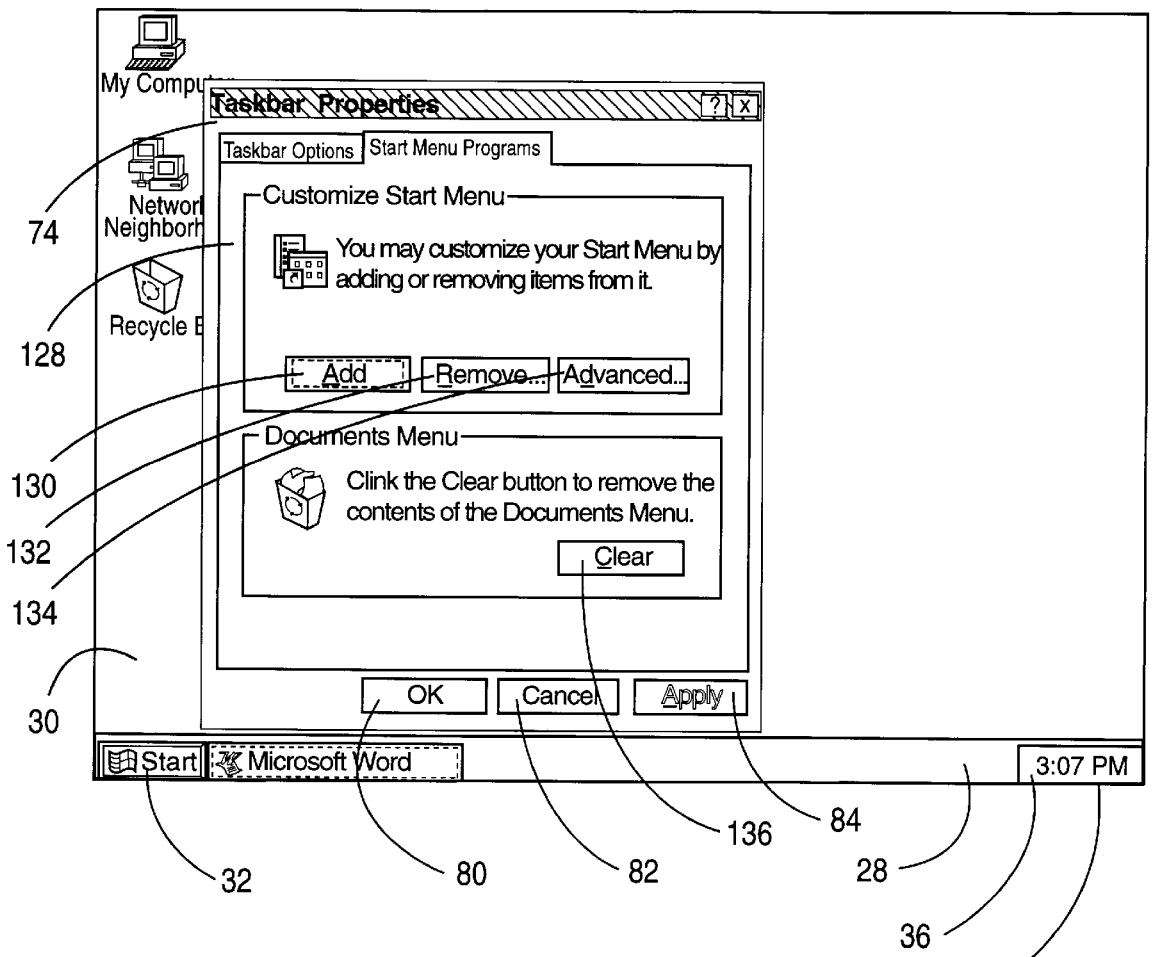
FIG. 20 illustrates a "Start Menu Programs" property sheet for the start menu.
Figure 25:
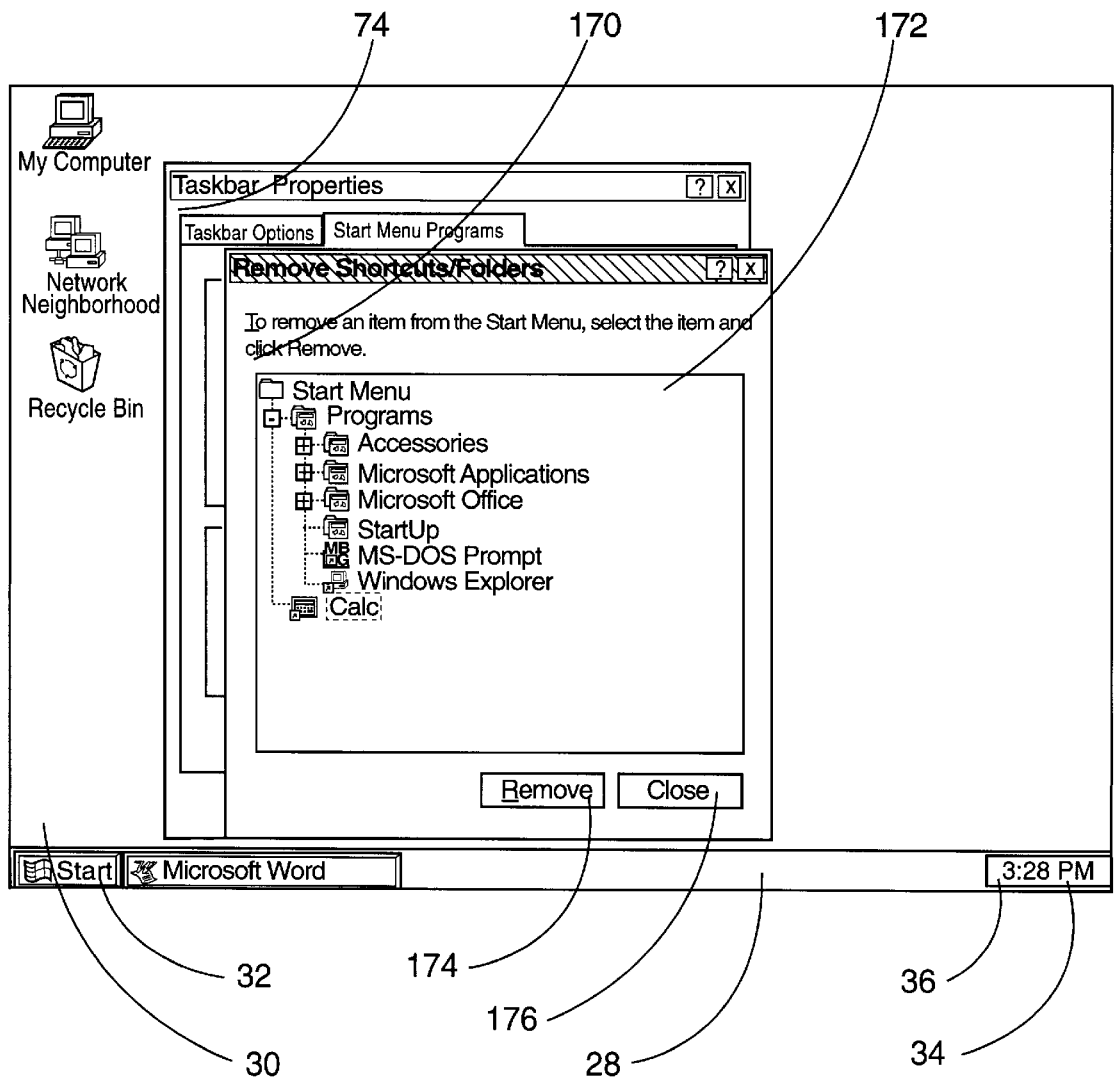
FIG. 25 shows a dialog for removing items from the start menu.

With regard to FIG. 20, if a user selects the remove button 130, a "Remove Shortcuts/Folders" dialog 170 (FIG. 25) is displayed. This dialog 170 displays a tree view 172 of the items that are currently accessible via the start menu 101. To remove an item from the start menu, a user selects an item in the tree hierarchical view 172 and presses the delete button 174. Selected items have their labels highlighted. In the example shown in FIG. 25, the "Calc" program is selected. When the user wishes to exit dialog 170, the user selects the close button 176.

Figure 26:
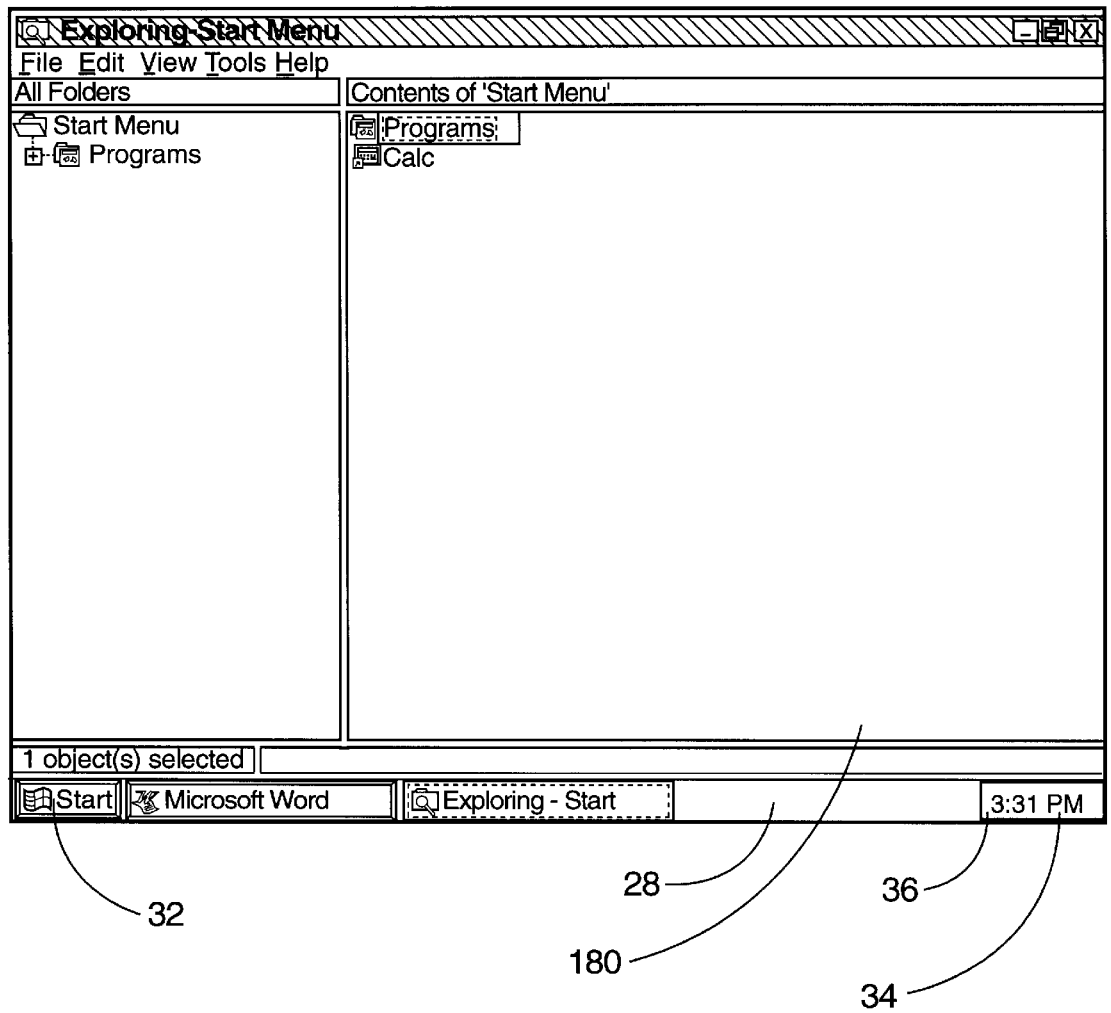
FIG. 26 shows an open explorer window for performing advanced manipulation of the start menu.

When the user selects the advanced button 134 (FIG. 20), a window 180 (FIG. 26) for exploring the start menu is provided. As the items shown in the explorer window 180 support OLE and WINDOWS drag and drop operations, they may be dragged and dropped to manipulate the start menu.

Figure 27:
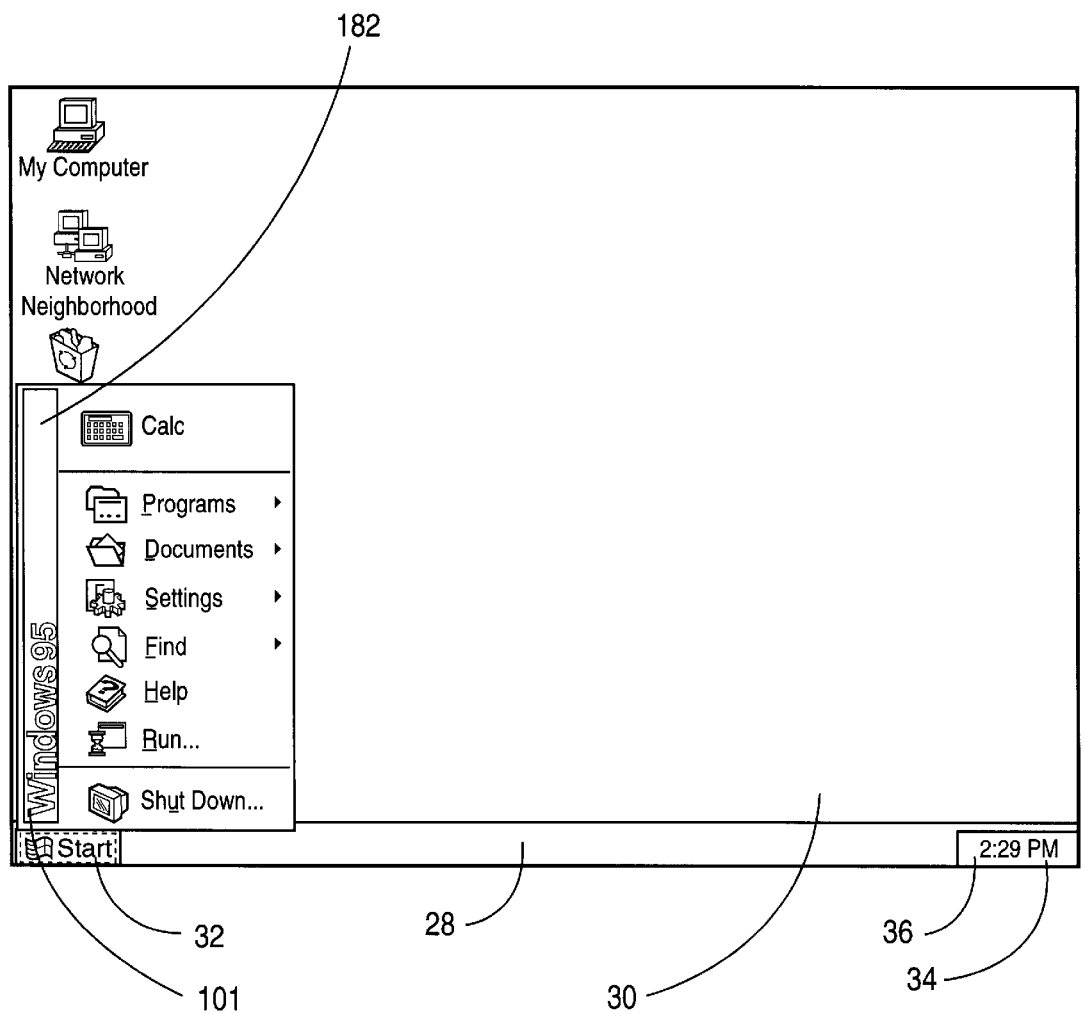
FIG. 27 shows an example of a start menu that has been configured to add an item to it.

When a user is completed with the property sheets of the frame window 74 (FIG. 20), the user may press the OK button 80 to accept the changes made by the user or press the cancel button 82 to not accept the changes made by the user. For the above-described examples, suppose that the user has decided to add the "Calc" item to the start menu via changes made to the property sheets. The start menu 101 then appears as shown in FIG. 27 with an additional menu item 182 for the "Calc" program. A user may then directly access the "Calc" program from the initial start menu 101, rather than traversing the cascaded menus to get access to the program.

Figure 28:
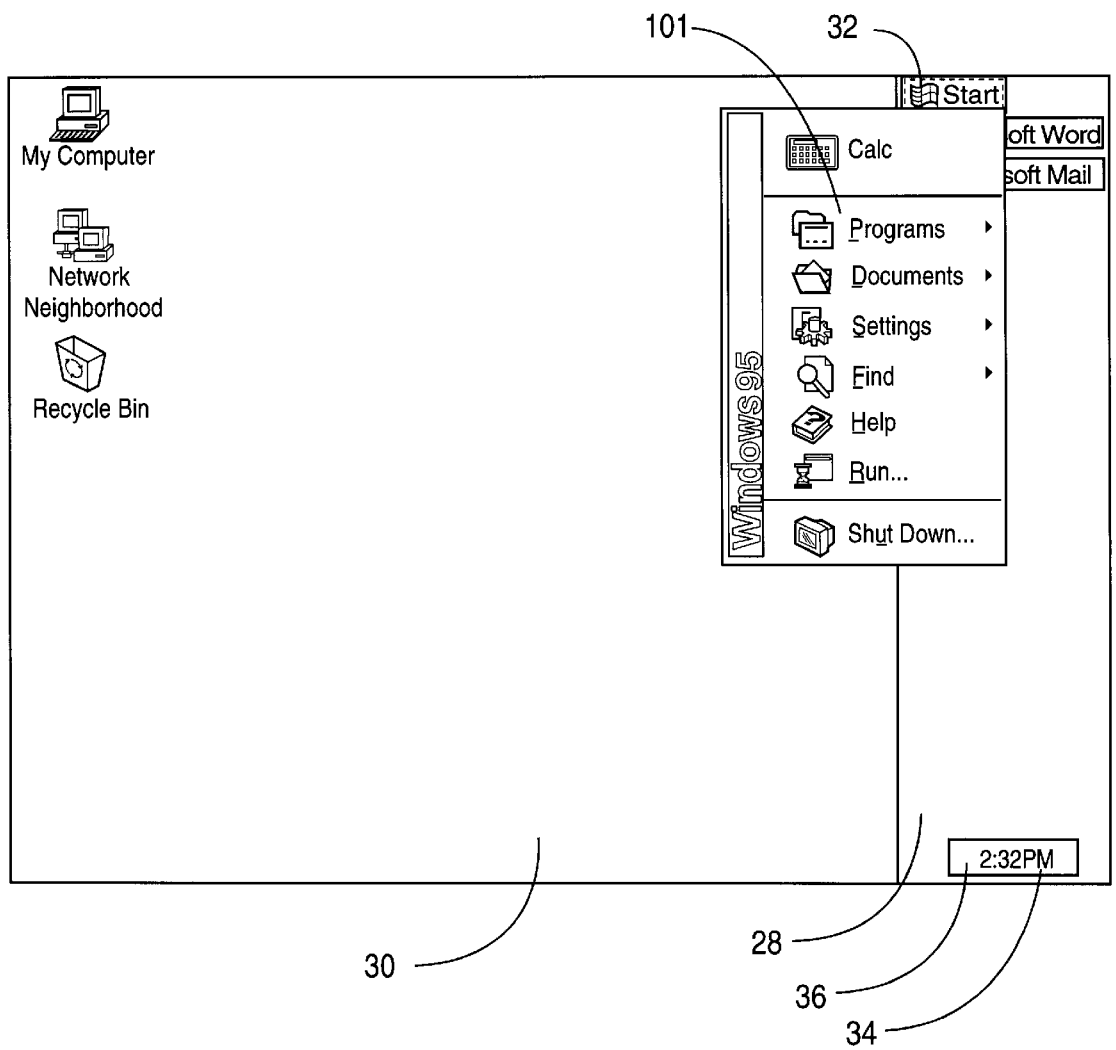
FIG. 28 illustrates the cascading of the start menu when the task bar is anchored to the right edge of the video display.

The above-described examples have generally related to instances wherein the taskbar 28 is positioned at the bottom of the user interface. It should be appreciated that the start menu 101 may be displayed at different locations and cascades differently depending upon where the taskbar 28 is anchored. FIG. 28 shows an example of the start menu 101 when the taskbar 28 is anchored to the right side of the user interface. The start menu 101 is under control of the taskbar process in the operating system 26. As a result, the taskbar determines where to draw the start menu. The location at which to draw the start menu changes when the taskbar 28 is moved to be anchored at a new location. In general, the start menu 101 is displayed to the interior side of the taskbar 28.

Figure 29:
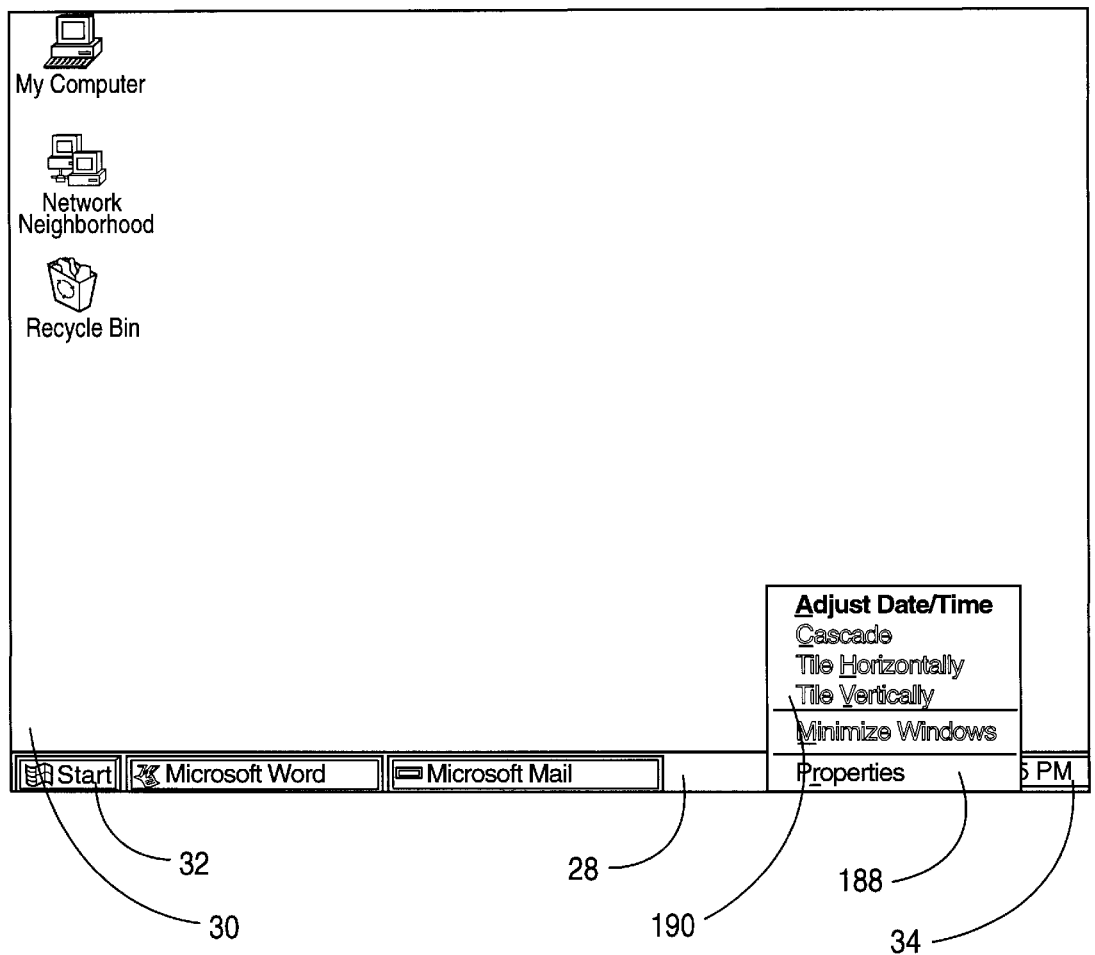
FIG. 29 illustrates a context menu that may be generated for the clock on the task bar.
Figure 30:
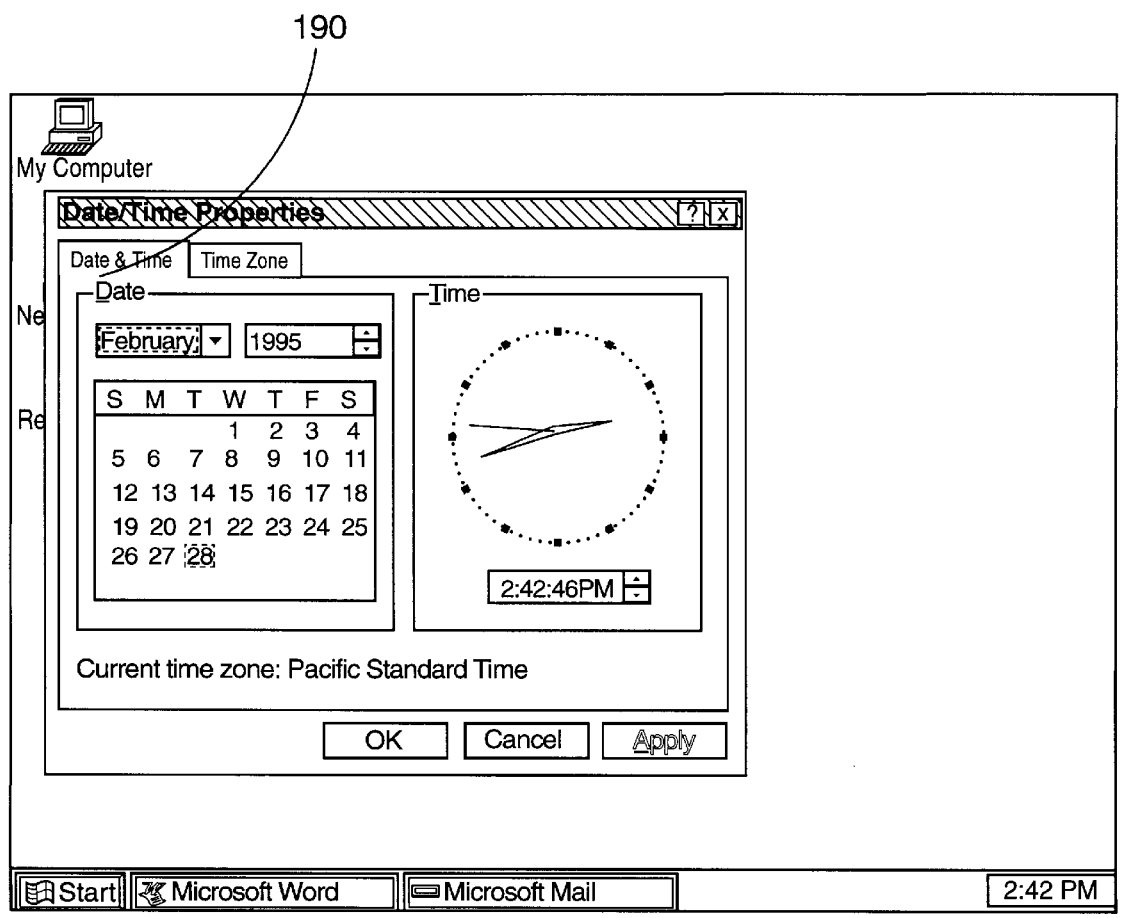
FIG. 30 illustrates an example "Date & Time" property sheet for the clock on the taskbar.
Figure 31:
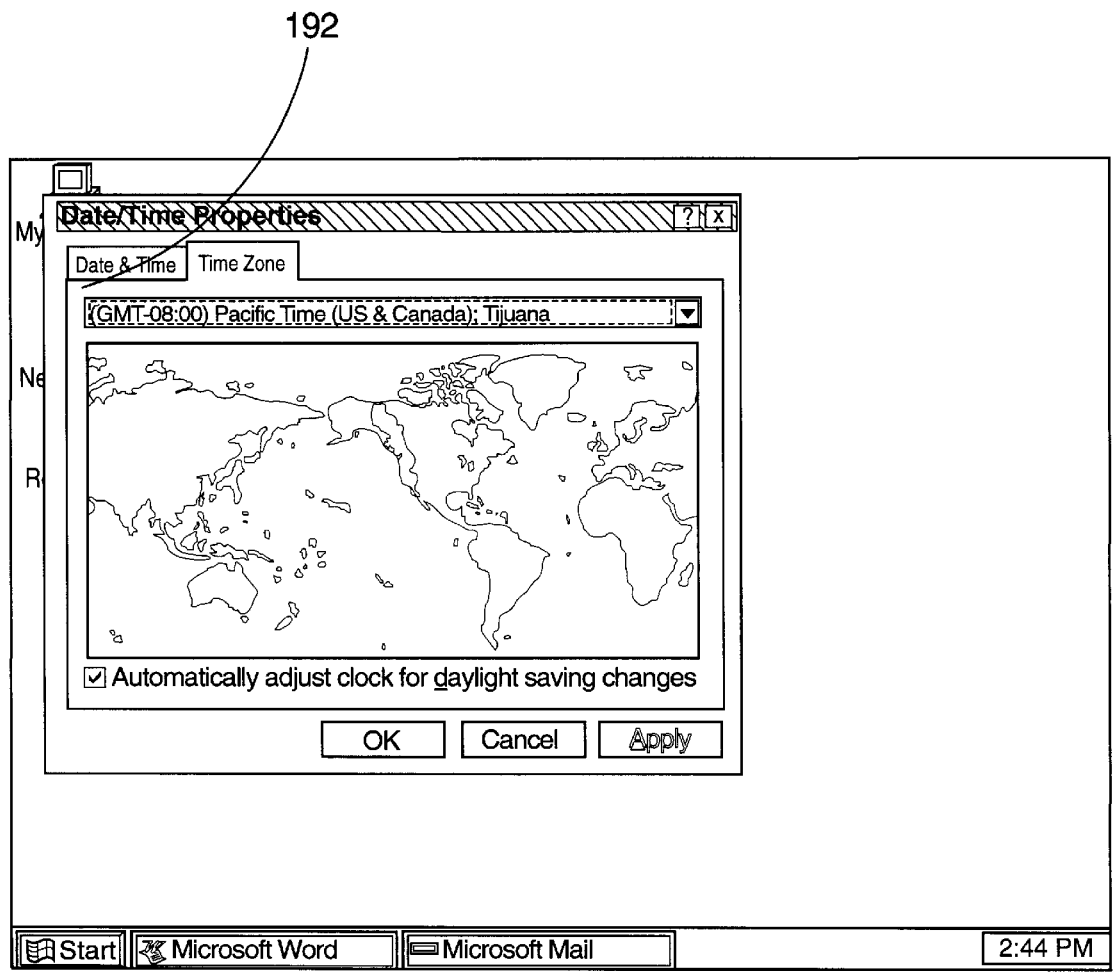
FIG. 31 illustrates a "Time Zone" property sheet for the clock on the taskbar.

The clock 34 on the taskbar 28 has associated property sheets. These property sheets may be accessed by either double clicking on the clock 34 or by invoking context menu 188 (FIG. 29). The context menu 188 is displayed in response to a user positioning a mouse cursor to point at the clock 34 and pressing the right mouse button. This context menu 188 includes an "Adjust Date/Time" menu item 190. The property sheets for the clock 34 include a "Date & Time" property sheet 190 (as shown in FIG. 30) and a "Time Zone" property sheet 192 (as shown in FIG. 31). These property sheets enable a user to select a current month, year, day, hour, minute, second and time zone.

Figure 32:
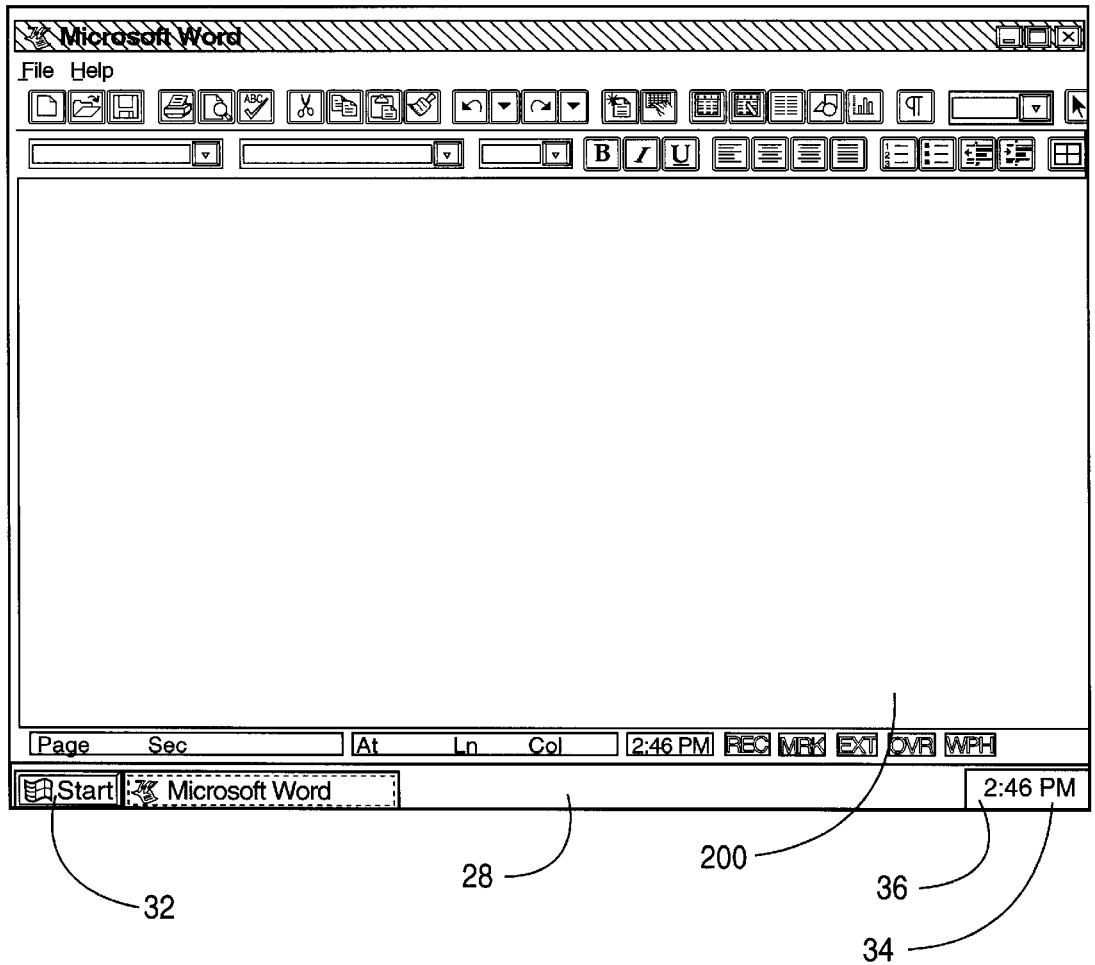
FIG. 32 illustrates how an opened word processing application window does not obscure the taskbar.

As was discussed above, the taskbar 28 is designed to be consistently visible such that it is not readily obscured by opened windows. As shown in FIG. 32, when a window for a word processing program is maximized, the maximized word processing window 200 does not obscure the taskbar 28. This is achieved by setting the working area available to application window to exclude the taskbar region. The taskbar does not cover any part of the word processing window, rather their borders merely meet.

Figure 33:
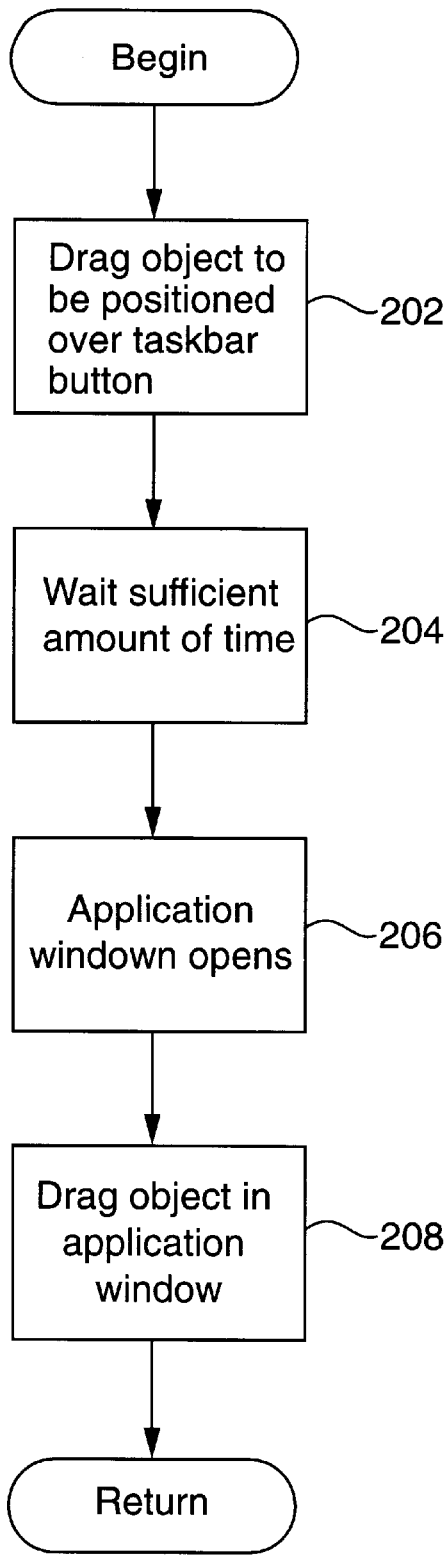
FIG. 33 is a flowchart illustrating steps that are performed to drag an object to a taskbar button.

One complication that arises with the taskbar concerns an instance where a user wishes to drag an object to an active window that is currently minimized. In the preferred embodiment of the present invention, the user may drag the object to the taskbar button that is associated with the application. In particular, as shown in FIG. 33, initially the object is dragged using the mouse 14 to be positioned over one of the taskbar buttons (step 202 in FIG. 33). The object must remain positioned with the mouse button continually pressed over the taskbar button for a predetermined period of time (step 204). When the predetermined period of time has elapsed, the application window associated with the taskbar button is made visible in a non-minimized state (step 206) and the user may drop the object in the application window (step 208).

The present invention has been described with reference to a preferred embodiment thereof. Those skilled in the art will appreciate the various changes in form and detail that may be made without departing from the intended scope of the invention as defined in the appended claims.

We claim:

1. In a computer system having an input device, a video display, and a plurality of applications, a method comprising the steps of:

outputting a user interface element on the video display, the user interface element including a taskbar sub-element and a non-overlapping sub-element identifying each application having an active window of the plurality of applications so as to simultaneously indicate to a user each application having an active window;

displaying a cursor on the video display; and displaying a context menu in response to positioning the cursor over the taskbar sub-element, the menu having a mode for arranging the display of the windows.

2. The method of claim 1, wherein the mode provides for the cascaded display of the windows.

3. The method of claim 1, wherein the mode provides for the tiled display of the windows.

4. A computer-readable medium having computer-executable instructions for performing the steps recited in claim 1.

5. In a computer system having an input device, a video display, and a plurality of applications, a method comprising the steps of:

outputting a user interface element on the video display, the user interface element including a non-overlapping sub-element for each application having an active window of the plurality of applications so as to simultaneously indicate to a user the applications having an active window;

displaying a cursor on the video display; and displaying a menu of context-sensitive items associated with a first application in response to positioning the cursor over the sub-element for the first application.

6. The method of claim 5, wherein input device has a button, and the step of displaying the menu associated with the first application further includes the step of activating the button.

7. The method of claim 5, wherein the computer system further comprises a second application having a second active window, wherein the first active window obscures the second active window.

8. The method of claim 5, further comprising the step of requesting one of the plurality of applications to display a non-minimized window of the application by manipulating the sub-element corresponding to the application in response to the user using the input device.

9. The method of claim 8, wherein the computer system includes a mouse having at least one button, said mouse for manipulating a cursor on the video display; and wherein the step of requesting the selected one of the applications comprises the step of positioning the cursor to point at the sub-element for the selected application and activating the button of the mouse.

10. A computer-readable medium having computer-executable instructions for performing the steps recited in claim 5.

11. In a computer system having an input device, a video display, and a plurality of applications, a method comprising the steps of:

outputting a user interface element on the video display, the user interface element including a non-overlapping sub-element for each application having an active window of the plurality of applications so as to simultaneously indicate to a user the applications having an active window;

outputting a visual indicator corresponding to the input device;

manipulating the input device in accordance with a predetermined sequence such that the visual indicator interacts with at least one of the sub-elements to thereby request one of the plurality of applications to display a non-minimized window; and hiding the user interface element while the non-minimized window is displayed.

12. The method of claim 11, further comprising the step of further manipulating the input device to thereby redisplay the user interface element.

13. The method of claim 11, wherein the visual indicator is a cursor displayed on the display, further comprising the step of positioning the cursor within a predefined area of the video display to thereby redisplay the user interface element.

14. A computer-readable medium having computer-executable instructions for performing the steps recited in claim 11.

15. In a computer system having an input device, a video display, and a plurality of applications, a method comprising the steps of:

outputting a user interface element on the video display, the user interface element including a non-overlapping sub-element for each application having an active window of the plurality of applications so as to simultaneously indicate to a user each application having an active window;

displaying a cursor on the video display;

unhiding the user interface element in response to the cursor being positioned in a first predefined area of the video display;

displaying a menu in response to positioning the cursor over the user interface element when the user interface element is exposed; and hiding the user interface element in response to the cursor being positioned in a second predefined area of the video display.

16. The method of claim 15, wherein the display area of the video display consists of the first and second predefined areas.

17. A computer-readable medium having computer-executable instructions for performing the steps recited in claim 15.

18. In a computer system having an input device, a video display, a method comprising the steps of:

outputting on the video display a user interface element containing a non-overlapping sub-element for each of a plurality of applications having active windows so as to simultaneously visually indicate to a user the plurality of applications, said sub-elements providing context-sensitive information in response to interaction with a user input indicator displayed on the display;

displaying a first sub-element corresponding to a first application having an active window;

determining the available space within the user interface element; and resizing the first sub-element and displaying a second sub-element corresponding to a second application in response to the running of the second application such that the first and second sub-elements do not overlap.

19. A computer-readable medium having computer-executable instructions for performing the steps recited in claim 18.

20. The method of claim 18, wherein the step of outputting on the video display the user interface element further comprises the step of outputting a sub-element for accessing a menu, the menu enabling a user to run programs on the computer system.

21. The method of claim 20, wherein the menu includes an option for accessing a list of most recently opened documents, further comprising the steps of:

maintaining a list of the most recently opened documents; and automatically adding a new recently opened document to the list of the most recently opened documents.

22. The method of claim 18 wherein the computer system further comprises an input device corresponding to the user indicator and wherein the method further comprises the step of resizing the user interface element in response to user manipulation of the input device.

23. The method of claim 22 wherein the input device is a mouse and wherein the step of resizing the user interface element comprises the step of resizing the user interface element in response to a user dragging and dropping a boarder of the user interface element with the mouse.

24. The method of claim 18 wherein the step of outputting the user interface element on the video display further comprises the step of outputting a taskbar notification area on the video display as part of the user interface element for displaying visual notification to users.

25. The method of claim 18, wherein the user interface element has a display mode in which the user interface element cannot be obscured by windows.

26. The method of claim 18, further comprising the step of changing the display mode of the user interface element to a second mode so that the user interface element can be obscured by windows.

27. The computer system of claim 18 wherein the indicator is a cursor, further comprising the steps of:

hiding the user interface element in response to the cursor being positioned in a first predefined area of the video display; and unhiding the user interface element in response to the cursor being positioned in a second predefined area of the video display.

* * * * *